United States Patent
Lahr

(10) Patent No.: US 8,930,959 B2
(45) Date of Patent: Jan. 6, 2015

(54) GENERATING EVENT DEFINITIONS BASED ON SPATIAL AND RELATIONAL RELATIONSHIPS

(71) Applicant: Orions Digital Systems, Inc., Snoqualmie, WA (US)

(72) Inventor: Nils B. Lahr, Snoqualmie, WA (US)

(73) Assignee: Orions Digital Systems, Inc., Snoqualmie, WA (US)

( * ) Notice: Subject to any disclaimer, the term of this patent is extended or adjusted under 35 U.S.C. 154(b) by 0 days.

(21) Appl. No.: 14/290,815

(22) Filed: May 29, 2014

(65) Prior Publication Data

US 2014/0279764 A1    Sep. 18, 2014

Related U.S. Application Data

(63) Continuation-in-part of application No. 13/471,302, filed on May 14, 2012, now Pat. No. 8,752,073.

(60) Provisional application No. 61/486,133, filed on May 13, 2011.

(51) Int. Cl.
*G06F 3/00* (2006.01)
*G06F 9/46* (2006.01)
*G06N 5/04* (2006.01)
*G06N 99/00* (2010.01)
*G06F 9/54* (2006.01)
*G06F 9/50* (2006.01)

(52) U.S. Cl.
CPC ............... *G06N 5/04* (2013.01); *G06N 99/005* (2013.01); *G06F 9/54* (2013.01); *G06F 9/5038* (2013.01); *G06F 9/46* (2013.01)
USPC .......................................... 719/310; 718/106

(58) Field of Classification Search
CPC .................................. G06T 9/54; G06F 8/433
See application file for complete search history.

(56) References Cited

U.S. PATENT DOCUMENTS

| 7,272,490 | B2 | 9/2007 | Imasaki et al. |
| 8,300,884 | B2 | 10/2012 | Sharma |
| 8,631,062 | B2 * | 1/2014 | Breiter et al. ................. 709/201 |
| 2009/0282067 | A1 * | 11/2009 | Bendigeri et al. ............ 707/101 |

OTHER PUBLICATIONS

Wei Tan, Dynamic Workflow Model Fragmentation for Distributed Execution, Jul. 2006.*
Luckham, et al., "An Event-Based Architecture Definition Language", IEEE Transactions on Software Engineering, vol. 21, No. 9, Sep. 1995, pp. 717-734.

* cited by examiner

*Primary Examiner* — Lechi Truong
(74) *Attorney, Agent, or Firm* — Lee & Hayes, PLLC

(57) ABSTRACT

Data from one or more sensors is input to a workflow and fragmented to produce HyperFragments. The HyperFragments of input data are processed by a plurality of Distributed Experts, who make decisions about what is included in the HyperFragments or add details relating to elements included therein, producing tagged HyperFragments, which are maintained as tuples in a Semantic Database. Algorithms are applied to process the HyperFragments to create an event definition corresponding to a specific activity. Based on related activity included in historical data and on ground truth data, the event definition is refined to produce a more accurate event definition. The resulting refined event definition can then be used with the current input data to more accurately detect when the specific activity is being carried out.

13 Claims, 13 Drawing Sheets

GENERATING EVENT DEFINITIONS BASED ON SPATIAL AND RELATIONAL RELATIONSHIPS

RELATED APPLICATIONS

This application is a continuation-in-part application of copending patent application Ser. No. 13/471,302, filed on May 14, 2012, now U.S. Pat. No. 8,752,073 which is based on a prior provisional application Ser. No. 61/486,133, filed on May 13, 2011, the benefit of the filing dates of which is hereby claimed under 35 U.S.C. §120 and 35 U.S.C. §119(e).

BACKGROUND

There are many difficulties in identifying complex events, such as recognizing a set of specific human behaviors combined with interactions with inanimate objects. At the same time, the amount of digital data being produced with meaningful event data is increasing exponentially. A single location today can have 6,000 video feeds and 3,000 microphones or highly sensitive air sensors. Timely detection of meaningful events can be helpful in a number of ways, including saving lives and resources.

Today's solutions are incremental additions to existing methodologies. The primary solution is to have a Network Operations Center (NOC), which is located physically near the appropriate sensor devices. Video feeds are typically viewed randomly by a 24/7 security staff. Some products can be installed to provide basic object detection, such as facial recognition, which in turn helps the security staff identify locations to investigate.

The field of object recognition has not advanced sufficiently to enable highly accurate detection of relevant data in real-time. Available systems come with the object detection systems built into the system, and today, there are only a few that are used for event detection. One issue that arises is that aspects of the object detection need to be defined prior to selling and deploying a product. Lack of confidence factors in object detection has led to an adversity in connecting multiple events, such as human behavior to specific usage of an identified object. Additionally, these events and behaviors may change rapidly over time, so that detection systems become quickly outdated. Because of the complexity in creating a framework around detecting objects, the best known generic system in widespread use is facial recognition. However, these systems have difficulty in processing images and providing highly accurate results in real-time. As new types of threats or actions are identified, these systems fall short of their ability to detect these new types of events. Due to the volume of real-time data, existing systems are used more in a forensics situation, rather than in attempting to provide real-time event data across most or all available feeds.

Clearly, it is important to develop technology that is adapted to detecting potential threats to the populace. However, this technology can be used in many other applications where historical data developed over time can be employed for detecting when abnormal behaviors or events are occurring in real-time data feeds. The applicability of such technology is virtually limitless and can range from detecting aberrant behavior of students in schools, where such behaviors might develop into a student harming others, to identifying potentially harmful drugs being sold on the streets.

As an alternative application of such technology, where real-time activities are observed, it would be desirable to be able to find all historically similar events, since in some cases, this information can be critical to many forensic and public safety situations. For example, knowing that a person of interest is meeting another individual, it would be desirable to be able to search historical archives for the individual. A review of such prior activities as captured in the historical archives might lead to developing information needed to understand the activities in which the individual is a participant, which are currently taking place. Yet, in many cases, finding information about an individual using currently available algorithms is impossible, for example, due to poor video quality and/or imperfect algorithms.

SUMMARY

This application specifically incorporates by reference the disclosure of each of the patent applications identified above as a related application.

The present approach relates to utilizing most or all available data, such as a plurality of video signals, to generate complex definitions of human behavior, spatial events and interconnecting relationships between the two. More specifically, the present invention relates to identifying a complex pattern, creating an event definition to match such activities, and taking appropriate action to confirm that a specific activity has occurred, and/or to notify other entities who may respond to the activity being detected.

One aspect of this technology relates to a dynamic event detection architecture configured as one or more HyperNodes. The dynamic event detection architecture includes a workflow engine that runs one or more workflows employed for processing input data by facilitating logic and state manipulation of the input data based on requirements of a specified task. A semantic database defined by an ontological model that is related to the specified task is employed, and the semantic database includes a meaning, rules, and data elements based on the ontological model. A HyperFragmenter system processes the input data in real-time, in a workflow, to produce fragments of input data that are self-contained and discrete. A HyperAsset file system is joined with the semantic database such that both operate automatically; the HyperAsset file system enables the fragments of input data to be stored and retrieved based on specified criteria. A plurality of distributed experts use an application program interface to facilitate review of the fragments of input data by the distributed experts at any point in the workflow and can also provide additional information to the fragments of input data. A plurality of event definitions is used by a first rule-based language engine to define events based on the fragments of input data in the workflow or based on relationships defined in the semantic database. Further, a plurality of situation definitions is used by a second rule-based engine to define complex situations to create situational rules. A filtration system then applies the situational rules to the workflow to determine if an output of the workflow requires further analysis.

Another aspect of this technology is directed to a method for processing input data in a managed workflow to identify events corresponding to a specified activity. The method provides for fragmenting the input data to produces fragments of input data that are self-contained and discrete. The fragments of input data are processed at one or more nodes, using a plurality of distributed experts, where the plurality of distributed experts working at the one or more nodes make determinations about the fragments of input data or add details to the fragments of input data to produce tagged fragments of input data. The tagged fragments of input data are also reviewed to create definitions for the events that are evident in the tagged fragments of input data. The method then determines if the events evident in the tagged fragments of input data likely correspond to the specified activity.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 11:
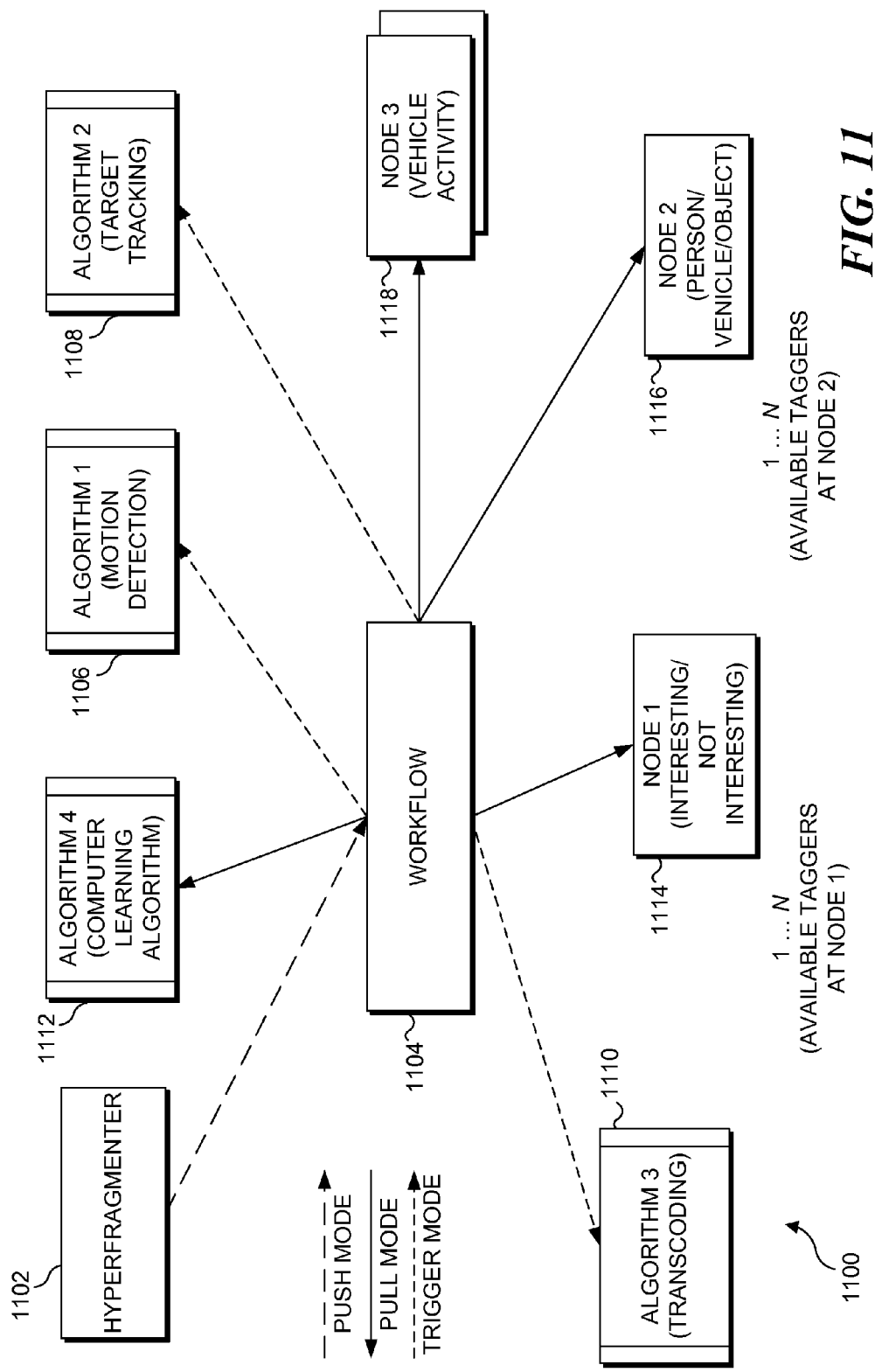
Figure 12:
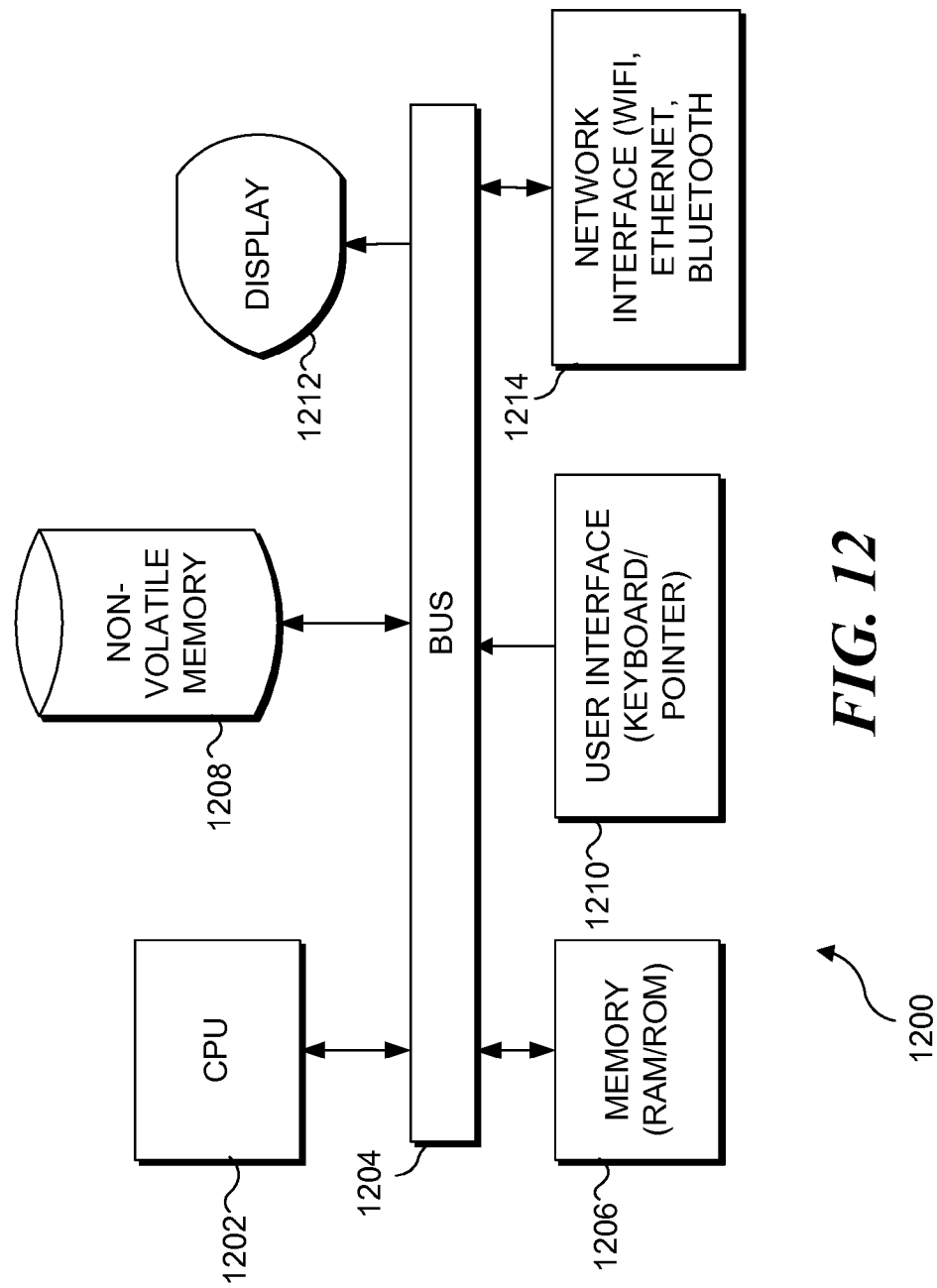

FIG. 11 is a schematic block diagram for an example illustrating how input video data provided by monitoring traffic on one or more roads is processed using the present technology to detect when vehicles have made an illegal U-turn and to determine if the U-turn is abnormal; and FIG. 12 is a schematic block diagram of a computing system that might be used to implement the present approach or that can be employed for the AI components of the present system.

DESCRIPTION

Figures and Disclosed Embodiments are not Limiting

Exemplary embodiments are illustrated in the referenced drawing Figures. It is intended that the exemplary embodiments and Figures disclosed herein are to be considered illustrative rather than restrictive. No limitation on the scope of the technology and of the claim set that follows is to be imputed to the examples shown in the drawing and discussed herein. Further, it should be understood that any feature of one embodiment disclosed herein can be combined with one or more features of any other embodiment that is disclosed, unless otherwise indicated.

In accordance with the present novel approach, there is provided a highly accurate object detection system combined with an event modeling capability such that complex definitions can be created to recognize a series of events in one or more data streams. The processing of input data is performed such that events and signatures of objects and interactions between can be stored for later use. The architecture employed in this system can include a set of event definitions that are loaded and prioritized to facilitate real-time monitoring of all available data feeds of one more types. Rather than focusing on a specific object type, such as faces, this approach focuses on implementing a range of event definitions that can all exist simultaneously. Also, in accordance with the present approach, a combination of distributed experts that can be automated and/or can involve human interaction are used to efficiently increase a range of an event definitions, while also increasing a confidence factor of a specified activity that is identified by processing the input data.

One exemplary embodiment of this invention would be to, for example, setup a pre-processing system at a casino. Initially, with no definitions, the system can convert the video data at the casino into abstract objects, and then create normalized signatures of each object. Although this disclosure does not cover the methods and procedures specific to creating these normalized signatures from a two-dimensional video feed, it assumes such a process exists and is substantially better than existing rasterized methods of object detection. The casino realizes that there is an issue with utilizing software on other computer-based assistance, such as an iPhone™ application, for card counting and that it is difficult to review thousands of video feeds in real-time, as well as decipher users of a legitimate iPhone™ application, versus the card-counting one. Initially, an expert system and/or human users can either create a real-time simulation inside the casino, or take existing footage of many video examples of people using the application to cheat.

In accordance with one exemplary embodiment, this material provide by video imaging would be used by the event modeling system to describe the signatures of an iPhone™ user's card counting or other cheaters. The initial definition would then be sent back to the data system and used in a historical sense, to pull out other possible examples across the archives of available video. Essentially an advanced historical search based on the newly created event definition is generated. The results of this step may be very large (i.e., thousands of hours of video) and still something a single Network Operations Center (NOC) would not be capable of adequately filtering. As per this exemplary embodiment of the present approach, the video is distributed in small units of work across the Internet to trained individuals, who can review and rate each event based on the intended match. The results from this work distribution are returned and the modeling language used to refine the event definition. This process may continue until the confidence rating is sufficiently high and/or the number of matches is sufficiently low that the final definition can raise notifications to which an always available NOC can respond accordingly.

As new events, or in most cases threats, arise, the methods and procedures within this approach are applied to generate a new event definition. Then, the new event definition is potentially distributed via a centralized service, such that all organizations with the system installed could benefit from each new definition. The world is an ever changing system and thus, the event definitions will be evolving over time as well.

Figure 1:
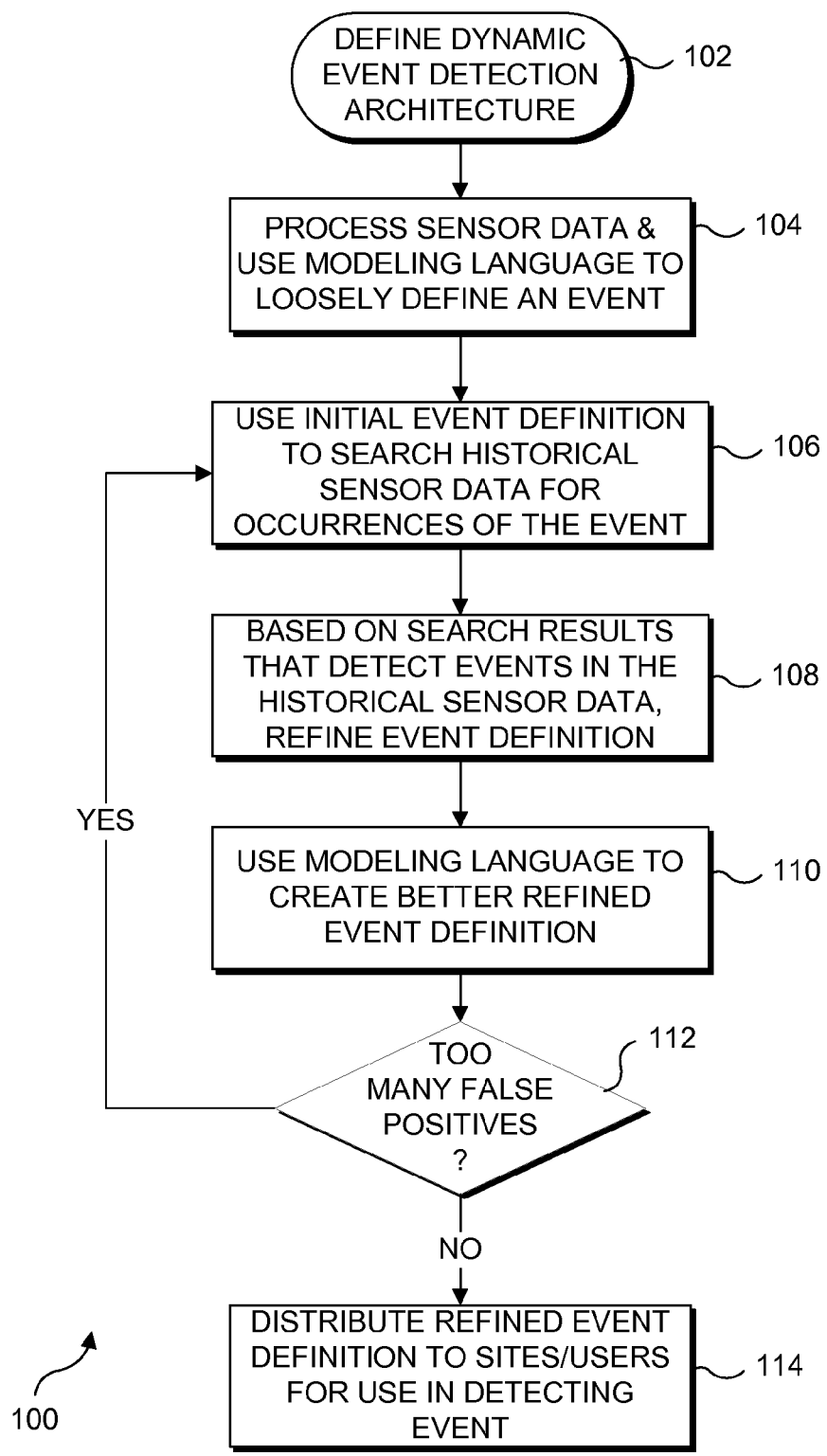
FIG. 1 is a flowchart illustrating exemplary logic for implementing the approach described below.

One exemplary process derived from this approach is shown in FIG. 1 and is described below:
  1. Define dynamic event detection architecture;
  2. New event occurs (event=complex interaction of movement, object, etc.);
  3. Video has been pre-processed enabling historical "matching" in a timely fashion;
  4. Modeling language is used to loosely define the event, which becomes the "event definition;"
  5. The event definition is then used to search the historical video;
  6. If the event definition returns too much video to readily process, units of the video are sent to a distributed work force that is running specialized software to rate the validity of each event match, such that the feedback from the work force becomes the input to create a new, more accurate event definition;
  7. The modeling language is used to create a better event definition, but if it still produces too many false positives, steps 5-7 are repeated; and
  8. Once the event definition is sufficiently accurate, it is distributed to locations and/or users subscribing to updated event definitions of that type.

Exemplary Dynamic Event Detection Architecture

While the previous system provides a simplified example, the concept embodied therein has been further developed to produce a dynamic event detection architecture that is a fluid and scalable system and which can work across a global network or within a single local area network. Because the components of the exemplary dynamic event detection architecture that are discussed below can stand alone, but work tightly together to enable a cyclic workflow, there are many ways to configure them in a system. The configuration employed will typically be specific to the manner in which these components are used for processing the input data and creating defined events. A generic approach for showing some of the main event driven concepts is shown in the exemplary embodiment of the dynamic event detections architecture shown in FIG. 2A.

Figure 2A:
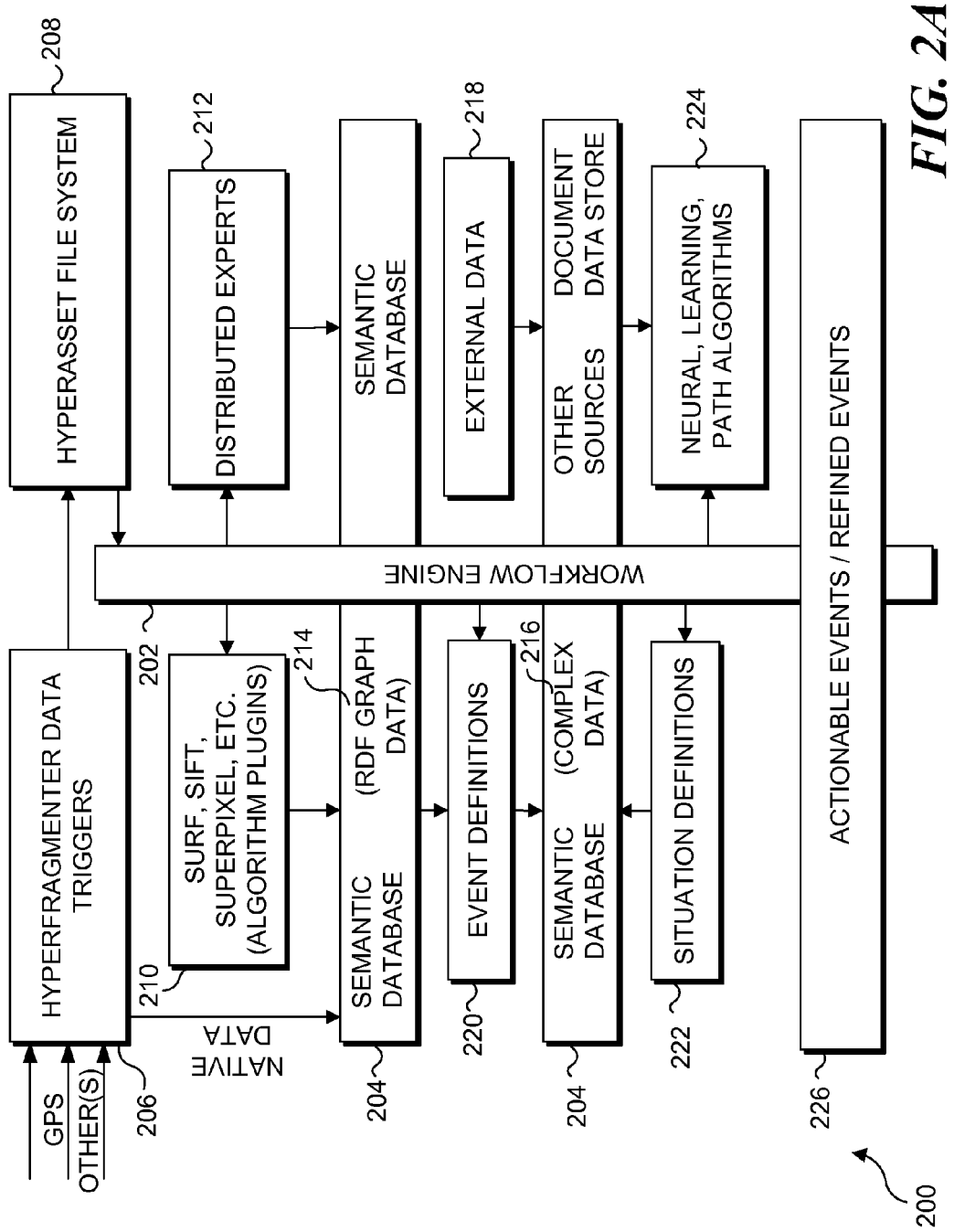
FIG. 2A is a schematic block diagram of an exemplary dynamic event detection architecture for implementing the present novel approach.

In the embodiment of FIG. 2A, the main building block is a HyperNode 200, which can be implemented as either a software or a hardware product. The hardware product includes components used in conventional computing devices, such as a laptop computer, but these components can be optimized to more efficiently use memory and caching to enable features and functions otherwise difficult for generic computing device hardware to achieve. Each HyperNode typically has the following components:

Workflow Engine 202—A system that is responsible for running one or more workflows, since the workflow engine can be loaded with a plurality of state engines, each corresponding to a different workflow, with nodes that are defined as Push, Pull, or Trigger (in regard to their function and the way that they operate). An open language is used to define the input, output, and other GUI and conditional properties of each node in the workflow. By breaking down the workflow into these nodes, it is possible for the workflow engine to keep track of each node's state, available work, and other conditions. A workflow is thus a complex state engine that can include complex rules to change from one state to another, for example, by running logic algorithms. Further, a workflow is a complex algorithm that uses both atomic and transaction functions in combination with optional event definitions. The workflow language is aware of the available data, as well as the functions being carried out, and event and situation definitions. A single workflow can be programmed with simple or complex logic flow concepts, using if/or/else/then style logic, as well as keeping its own state variables at each step along the flow. The workflow engine is directly involved in enabling the present system to understand real-time events and triggers from all other components of a HyperNode, such that each workflow can use these real-time events and triggers in novel ways based on the requirements of a given task. Breaking a larger problem down into smaller pieces facilitates the logic and state manipulation provided by the workflow engine that is building the small pieces to drive the resources of the system based on their availability. The capabilities of a workflow in the present technology will be much more readily understood in connection with examples provided below.

Semantic Database 204—A database that includes a meaning and rules, as well as data elements that are connected to the meaning based on an ontological model. This model for a database can change without impacting the data stored within it, enabling many models to coexist, each specific to very well-defined tasks.

HyperFragmenter 206—A system that can change real-time data feeds into discrete HyperFragments of input data, such that each HyperFragment is self-contained. Use of self-contained HyperFragments enables distributed computing tasks, where each HyperFragment has its own version control, permissions, data and other elements needed for processing. Each HyperFragment is managed by the architecture such that it knows its own relationship to the originating data feed(s), but also includes temporal and special information, both for the HyperFragment, as well as specific content within the HyperFragment. For example, a five second HyperFragment of a live video data feed may be formed starting with an I-frame for the HyperFragment, which includes all of the information for a single frame. The remaining information in the HyperFragment would then comprise the following delta frames, which define the changes in each successive frame relative to the initial I-frame. This exemplary HyperFragment is self-contained because it requires no information from the previous HyperFragment of the video data feed. To decode video, it is often necessary to access some information about the video, which would be included at the asset level for the frame; however, the HyperFragment can still be used without requiring any information from previous or future HyperFragments in the video stream. An example of "special information" might be pitch, roll, yaw, altitude, airspeed, GPS location, as well as pilot ID, heart rate, and voice recording, where such special information might be included with the video data feed from the forward target view camera of an aircraft.

HyperAsset File System 208—A file system that can store and retrieve HyperFragments based on various simple or complex criteria. The HyperAsset File System is joined with the Semantic Database, such that both interoperate automatically. Data going into the HyperAsset File System has semantic data automatically generated against a HyperAsset ontology, thus enabling any aspect of an asset, HyperFragment or its data content to also use the ontology, thereby providing context to its own semantic information.

Algorithm Plug-ins 210—Plug-ins that are created to work within a HyperNode and which can process any incoming data, such as video, images, sound, etc. One function of a plug-in is to tag its output data so that the data can be stored in the Semantic Database for later use. In some cases, the raw output is stored in a local document store, not in the Semantic Database, but the data would still have semantic information so that the useful data points are available to other parts of the present system. While it is hoped that raw output data is always stored by the present system, in some cases, such data may already be stored in connection with an existing solution, so that it would not be desirable to replicate the data. It is also expected that synchronization might be maintained by the system, so that data may be stored outside the system, but so that sufficient semantic data can be imported into the system to enable the system to still use the externally stored data effectively. Included are atomic functions, examples of which are algorithm plug-ins, which assumes that all of the data needed by a plug-in is available. A simple atomic function would be: F(image, image+1)=moving areas. Such an atomic function would compare two images and produce an output corresponding to the areas that are moving or that are different between the two images. Another type of plug-in algorithm implements a transaction function, which is a multi-transaction, meaning that the data for the function is not yet available and must be found using resources that are not immediately available. An example of a transaction function would arise if an SMS message is sent to a human asking a question with a "yes" or "no" answer. In such a function, an external system or source would be returning information that is based on the transaction indicated by the question and this type of function is thus not an atomic function.

Distributed Experts 212—These can be anything that uses the application program interface (API) to enable obtaining information from an external source. Typically, a distributed expert is an application that would request a human to review some data and provide annotations or other tagging data, which might be too difficult for a computer to provide. The Distributed Experts enable human cognitive resources to be used at any point within a workflow, and also enable the human resources to be combined with artificial intelligence (AI) resources. At some point in the future as the AI software improves, it is possible that the Distributed Experts would only comprise AI resources.

Resource Description Framework (RDF) Graph Data 214—This is the basic language used to maintain data within the Semantic Database. At its core, RDF enables a user to define any graph where there are nodes and edges between nodes and is sufficiently flexible to describe any graph of nodes and edges. Semantic data and Ontologies are both defined using RDF (or technologies that build on RDF—like XHTML builds on XML). A basic node, edge, node, is what RDF calls "Subject Predicate Object," which means any graph can be described by this "tuple." In its most simple form, a text file containing these three items per line can define any data or ontology within a Semantic System. One example would be: "Joe is A Human," which defines "Joe" as a "Human." Another tuple might indicate "Human is Type *Homo Sapiens*."

Complex Data 216—Although also represented using RDF, this data is deemed to be complex because it represents the results of event definitions, situation definitions, and other more complex reasoning, and/or prediction, as well as large data algorithms. As used herein, graph data can represent any data or ontology, complex or simple. "Complex data" is data that has been created using more basic data. For example, if a rule states that, "All houses have four windows," and it is determined that, "House X has three windows," the resulting data might be a conclusion that, "House X is not really a house." This third data concept result is "complex," because it builds on the rules of a what is a house and the data for a building that doesn't fit the rules. The "complex" data is almost always the product of a complex workflow, which is essentially a complex algorithm that builds on the initial data being put into the system, or on the output of an algorithm, and/or on human expert data that are added to the initial data. With "Big Data," algorithms can organize the raw data and ontology rules to represent the information differently. The results of taking a Big Data approach to the more automated data, produces more data referred to as "complex data." Another aspect here is that the "complex data" is almost always derived from data already in the system, so one aspect of the complexity is that a link is maintained from the resulting summaric or transformed data that is complex, to the data that generated this "complex data."

External Data 218—Data used by the system can be obtained from other sources. The external data might be loaded into the complex data system or used directly by any of the components. Plug-ins, for example, can have their own system and API to connect with external data sources, although implementing that functionality means that the plug-in requirements are more than just what is available on a node.

Event Definitions 220—These comprise is a rule-based language engine that enables defining events based on data or relationships that are in turn defined in the semantic database. An example of such an event is: a moving object having a size x, or a shape y, or a color histogram z. Events can be relational, in that they can build on each other. An event definition is similar to a database trigger, which "wakes up" when a set of conditions is met. Simple definitions are set up to trigger when specific atomic or transaction data are generated. Event definitions can also be transaction functions that wake up based on the need to provide a required input for the system.

Situation Definitions 222—These comprise a rule-based language engine that enables defining complex situations, either heterogeneous or homogenous. By using available simple or complex data, situational rules can be created. Examples of homogenous situations are: Object Moving Fast, Person Runs, and Car exits. Examples of heterogeneous situations are: Phone rings five times; Traffic light changes but no cars are waiting; and, Persons enter a building more than three times within five minutes. Situation definitions also can determine if a certain state has been reached and can wake up when a set of conditions are met. More complex definitions typically include neural algorithms and make decisions that may change over time as the algorithm learns more from the data it is handling and/or has the benefit of access to more baseline training data.

Path Algorithms 224—These are algorithms that can be triggered by the workflow and can be dependent on any amount of previous data becoming available. A path algorithm is responsible for running and maintaining a state engine, or more typically, a statistical model system. Examples of a path algorithm are: Semantic Link Association Prediction (SLAP) for predicting drug interactions (using a statistical algorithm that predicts "missing links" or areas of the "Graph Data" that seem to be missing based on the available data and rules, creating a drug similarity network graph that can make predictions for new indications of existing drugs), and Bayesian probability systems for detecting the probability of something happening again, given a specific set of conditions, and neural algorithms, which can use such things as a least path graph analysis to predict or derive intelligence from large sets of complex data patterns.

Actionable Events/Refined Events 226—A final filtration system that determines if the output of a workflow requires action, or at least exporting to other systems for further analysis. For security, the present system might use a "machine learning algorithm." For example, a known data set comprising a video of people walking out of a building and into a parking lot might be input to the system. The algorithm "training data" would provide a basis for "normal" activities over a range of time such that most if not all typical activities were provided to the training of the algorithm. This algorithm would then be provided real-time data and requested to determine if there were any data points that were out of its 'typical' range of acceptable data. A specific example of atypical data points in the training data might be the case that no person ever left something on the sidewalk and then walked more than 5 feet away for more than 30 seconds. If such activity were observed in the real-time data, then the algorithm would clearly mark this activity as atypical or abnormal. Accordingly, the filtration system compares resulting data, complex data, and the results of available computer learning algorithms to decide if there is a situation that needs more attention. It is possible to include humans in the "filtering stage," as they can also be used to decide if a set of data represents something important or not. These events can also be written back into the data stream for use via other tools, such as querying historical information, analytics, and data modeling.

Setup Configuration of HyperNode Components

An example of how the components of exemplary HyperNode 200 are employed to execute a workflow follows. However, before implementing a workflow, it will typically be necessary complete a setup phase. Although the system illustrated in FIG. 2A can adapt over time, there are some aspects of the process that should first be configured before starting a workflow, as will be apparent from the following discussion. First, HyperFragmenter 206 should be configured so that incoming input data streams are synchronized. For example, assume that the input data streaming into the HyperFragmenter includes Global Position Satellite (GPS) data or geo position data specific to the location of a video camera, video data provided by the video camera, and pitch, roll, and yaw data providing information that is updated many times per second based on the camera being disposed on a moving platform such as a drone or other type of aircraft. HyperFragmenter 206 is configured to buffer each of these related data streams for sufficient time such that a single five second segment of each of the input data streams is available at the same time. Thus, five seconds of the input data streams are configurable. GPS data, for example, might be delayed two to three seconds relative to the real-time video input data feed. However, the first HyperFragment, and each HyperFragment thereafter, needs to contain all of the input data from these different sources of the related input data streams corresponding to the same time period. For this reason, it may be necessary to delay creating the first HyperFragment by a few seconds, so that there is sufficient GPS data corresponding to the same video input data used for a given HyperFragment.

Additional configuration consideration can include the need to transform certain types of input data before the input data are added to a HyperFragment by HyperFragmenter 206. For example, GPS data is converted into Semantic Web data based on a standards-based ontology for describing GPS samples used in HyperFragments. Also, data filtering may be applied, since some of the input data may not be needed. In some cases, data transcoding may be required, for example, to convert analog input data to digital input data, or to convert video input data into an H.264 format, or to provide alternative versions of an input data stream. One example of the transcoding function would be to convert high definition (HD) input video into a lower bit rate version that is more readily handled by the present system.

It should be noted that input data transformations, filtering, and transcoding can be carried out using outside resources, as well as in HyperFragmenter 206. For example, transcoding of an HD HyperFragment output from the HyperFragmenter can be implemented so that the lower bit rate HyperFragment is then processed by the architecture of HyperNode 200, and initially stored by HyperAsset File System 208.

In a most basic setup of the system, HyperAsset File System 208 can be configured to point to a local or network drive location. In a more advanced setup, data HyperFragments managed by the HyperAsset File System can be stored and retrieved from a Hadoop™ or MongoDB™ cluster.

In regard to algorithm plug-ins 210, it will be understood that many algorithms employ startup variables that can be configured to perform various tasks, and these variables should thus be configured for each algorithm plug-in. It is also possible to configure the same algorithm multiple times with different startup arguments or variables.

Although Distributed Experts 212 are not specifically configured in a workflow, the system can track experts in a separate database that includes, for example, security permissions, roles, groups, and specific skills that each expert is trained to apply.

It should be noted that workflows in the present system typically use semantic data to trigger situation definitions and also to keep track of all of the ontologies used by all of the components of HyperNode 200. Semantic Database 204 is configured with the ontologies needed to understand the data being asserted when it is generated by each of the components. For example, for GPS input data, there is an ontology that enables adding GPS data points into the Semantic Database with predefined identifiers for each of the needed data points, which means that the Semantic Database is typically loaded with the ontologies used by the workflow as at least part of the configuration process.

Event Definitions 220 can be of many different forms. These definitions are essentially blocks of logic, programming, and scripting that can recognize when something in the system happens that is an event, and use the recognition of the event to generate new data and/or new events. In the present system, a "Rule Language" is employed that enables rules to be defined, which have complex conditions. These rules can review SPARQL queries, and the results, and then apply logic operators to define what happens based on the data generated. (Those of ordinary skill will understand the SPARQL is similar to SQL, in that it is the query language used to query a Semantic Web Database.) An example of a "pseudo code" event definition in the present system might be:

IF PersonX Is Identified at a Location More Than Y Times in the last 24 hours, THEN PersonX is Loitering.

It should be understood that the present system often employs data sources beyond those shown in FIG. 2A. The present system thus is set up to use External Data 218 and includes adaptors that can convert most external data sources into what is referred to as a "SPARQL Endpoint." As a result, data used by the system can be treated as Semantic Web Data, but can include the external data in queries that cover the local and remote data sources. Accordingly, the adaptors are configured to make the External Data accessible to the Rules used for event and situation definitions, as well as for the workflow system.

Complex Data 216 is typically generated and is referred to as "complex" because it isn't created from simple atomic events, but instead, is created through use of incoming data, workflow information, and data generated by the Rules used in the present system.

An important aspect of the present system is the use of Situation Definitions 222, which although related to event definitions, are much more complex. The present system uses Rules language, but situation definitions provide a much richer vocabulary that enables reviewing data to be defined from all aspects of the system, to facilitate making decisions. Often, the decisions require computer learning algorithms to be used, so that the algorithms learn from mistakes and can be trained to make more accurate decisions using Ground Truth data and by requesting confirmation from external sources, such as one of the distributed human experts.

Configuration of Neural Learning Algorithms 224 comprises loading the algorithms with training data that provides these algorithms with information necessary to enable the algorithms to "guess" probable output results, when provided with sufficient new input data.

Actionable Events 226 are configured in a manner similar to the situations that use rules in the present system. However, they differ because the result of an actionable event is not intended to impact the system further. Actionable events and situations can create more data, thus potentially kick starting different aspects of the workflow. In the present system, these actionable events typically fire off a trigger to send an e-mail or enter an alert into a monitoring system. These actionable events can actually send an SMS to a person responsible for handling the event that was triggered.

Workflow Engine 202 is the most important component of HyperNode 200, because it is responsible for maintaining state for the present system. Although illustrated in FIG. 2A as a single element, it is possible to run the Workflow Engine across a distributed computer grid, where each node of the grid runs all or part of the workflow managed by the Workflow Engine. The workflow defines a semantic graph, where each node can have different properties, such that the entire graph works as a complex state engine. Demos of the present system have shown how to build a very simple workflow that has the following three nodes, which also correspond to states within the workflow:

(a) First node
  (1) This node has a SPARQL query, which has the following query logic: "Return all HyperFragments in a Specific Mission that have not yet been marked as either Interesting or Not Interesting." The node has a Tagonomy connected to a simple ontology, which is a Taxonomy that has two options:
    i. Option 1: "Interesting"
    ii. Option 2: "Not Interesting"
  (2) A much more complex logic can be part of the node. For example, return only HyperFragments that are not more than X minutes old, or HyperFragments that have been processed by another area of the workflow.
(b) Second node
  (1) This node has a SPARQL query that performs the following logic: "Return all HyperFragments that are marked Interesting."
  (2) The node has a Tagonomy connected to an ontology, which is the following Taxonomy:
    (i) Person
      1. Male
      2. Female
    (ii) Vehicle
      1. Air
      2. Land
      3. Sea
    (iii) Object
      1. Feature
      2. Fixed Building
      3. Temporary
  (3) Additionally this node indicates that the Tagonomy is to be applied as a sub-selection of a video frame. Yet, it is possible that rather than being frame-based, it could be motion-based, so it would indicate that the tags need to be connected to an object identified by algorithms across multiple frames.
(c) There are actually three nodes in the last "state," and each node is connected to the results of the second node. For example, if something is marked as an Object, then the second node has a complex Tagonomy of all things possible for Objects. The same applies to the other Tagonomy choices from the second node above. It is possible to have nodes that match only complex tasks combining conditions from many areas of the present system.

Distributed Processing of Data

Once the configuration and setup of the components of the HyperNode is complete, the system would typically employ a "pull-based" model to gather input data, although the workflow can also perform tasks using a "push-based" model. Use of a push-based model would mean that as a specific workflow node condition is met, an active process is started. An example of this function might be the logic, "Anything tagged as a White-Female-Person should be sent via SMS to PersonX and connected to a Tagonomy." Perhaps the Tagonomy provided to PersonX in this case would be simple, e.g., two options, "Confirm or Reject." PersonX would then either Confirm or Reject that the image sent to them is of a White-Female-Person, and the results would be returned to the system, potentially triggering additional nodes in the workflow.

In a simple example showing how the present system is used to implement distributed processing of input data, a pull-based model might be used. In this exemplary approach, a graphic user interface (GUI) system is employed on a client computing device of a user that enables the user to log into the system and select a specific node for which the user is going to perform work. If a first user logs in and wants to perform work for Node 1, the GUI system might request ten HyperFragments of input data on which the first user will perform work. These ten HyperFragments can be found using the SPARQL associated with Node 1, in the workflow. The GUI system then uses the available Tagonomy to enable the first user to mark each of the ten HyperFragments as "Interesting or Not Interesting." The same approach is employed for workflow Nodes 2 and 3, however with small differences. For this example, with Node 2, a second user must first select an area within a HyperFragment, for example, by playing a video HyperFragment, pausing it, and then using a selector (e.g., a pointing device or mouse-controlled cursor) to select an area in the image visible on a display of the user. For workflow Node 3, in this example, the GUI system shows ONLY the area selected previously by user 2 and then enables a third user to provide a more complex Tagonomy based on the information provided in workflow Node 2.

In this manner, this exemplary simple three node workflow can enable a highly efficient distribution of work across three stages of users. Each of these steps at Nodes 1-3 can be further broken down into an infinite number of smaller or alternative stages for more efficient distributed processing, and through push and/or pull mode methods, the work can be performed in a distributed task manner by computers implementing AI functions, or humans, or a combination thereof.

Use of Tagged Data Fragments by the Present System

Figure 2B:
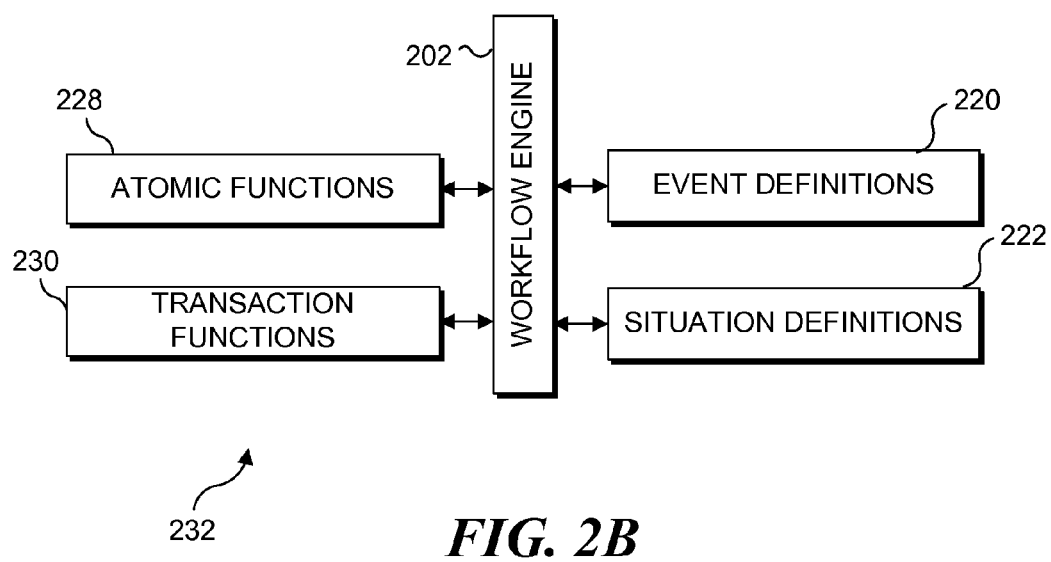
FIG. 2B is schematic block diagram illustrating a simplified organization of key portions of the exemplary dynamic event detection architecture shown in FIG. 2A.

A simple diagram 232 of key components of the system is illustrated in FIG. 2B, components of which are discussed above. A novel part of the technology is that all of these systems shown in FIG. 2A can be handled within a single workflow controlled by workflow engine 202. Situation Definitions 222 are to some extent much more complex event definitions, so these are "optional" in terms of the diagram shown in FIG. 2B. In a way, atomic functions 228 relate to simple event definitions 220, while transaction functions 230 relate to situation definitions 222. Any or all of them could be driven by a human or a computing device executing AI software, but the transaction functions are compounding information from the atomic functions. Because these are abstract constructs, the workflow could continue to run any number of these systems in any order to build an ultimate knowledge system for making very complex decisions. Also, this system does NOT require that data must exist or be made available upon request. Instead, the system can collect the available data but then wait for additional data that is being requested, such that when the additional data is available, the transaction completes and the resulting data is now available for further processing.

HyperFragmenter 206 is included in FIG. 2A, but not in FIG. 2B. For the functions and definitions of FIG. 2B, the information needed to run these, at least in the first phase, is typically tied to a small set of the data. By HyperFragmenting the input data stream, it is possible to more efficiently distribute all of the data needed to perform a specific function and to provide the resulting information to the running definitions within the Workflow. Fragmenting the data with the HyperFragmenter enables each of the functions and/or definitions to be available anywhere in the network, and the bulk of the temporal data required to do work can be contained in a single data stream. Using HyperFragments to encapsulate dynamic data is novel. Fragments are used ONLY for static content distribution and these small capsules of data can be used in a distributed system where each element of the system can add data to HyperFragments and send the HyperFragment back and/or synchronize just the changes. The HyperFragments have "Vector Version Control," so it is also possible to keep track of distributed modifications to any data element in the system. Thus, rather than using HyperFragments as a static distribution concept, they can be used to drive the workflow system and to enable mini-databases per asset, track, HyperFragment, and slice of data. This capability enables a fully bidirectional data architecture where the data transport is HyperFragments, and/or messages with information about HyperFragment modifications.

Figure 3:
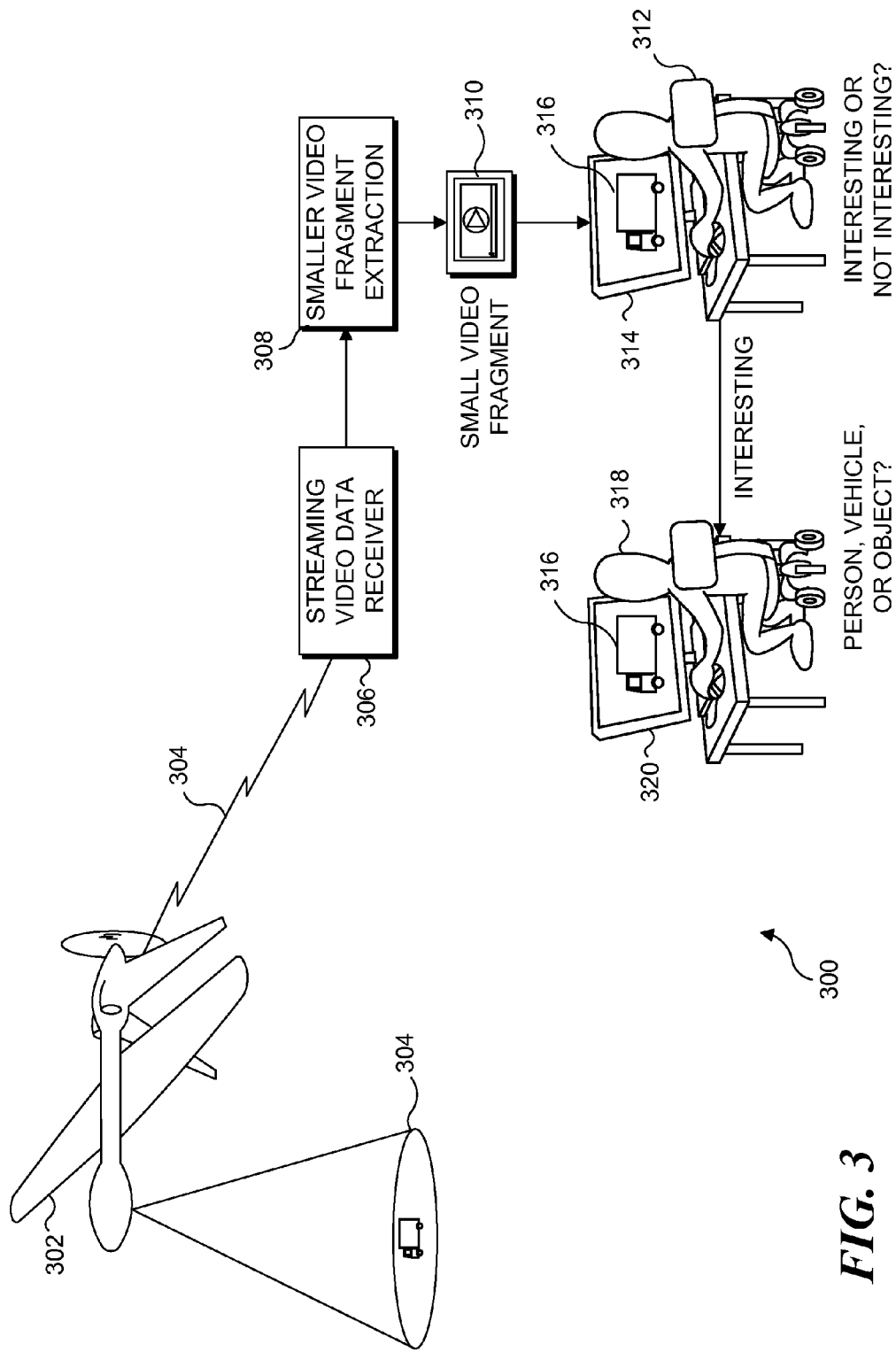
FIG. 3 is a schematic diagram showing an example of a drone aircraft producing streaming video data that is received and broken into small HyperFragments for processing by distributed human experts in a workflow.

Examples Illustrating Distributed Processing of Input Data by the Present System One type of data that is typically processed by the present system is streaming video data. In an exemplary block diagram 300 shown in FIG. 3, a drone aircraft 302 is overflying and producing streaming video of a region 304 through which a truck is being driven. The streaming video is being transmitted via a radio frequency signal 304 to a streaming video data receiver 306, which can be located at a fixed or mobile site on the ground or in the air. The streaming video comprises a sequence of video frames that are input to HyperFragmenter 206 (FIG. 2A), which implements a smaller video HyperFragment extraction process 308 to produce a small video HyperFragment 310. The workflow in this example requires all incoming video HyperFragments to be sent to at least one (of a plurality of) Distributed Experts 212 (FIG. 2A), such as a person 312, whose only task is to mark each video HyperFragment as either "Interesting" or "Not Interesting." Person 312 views the video HyperFragment that shows a truck 316 on a computing device/display 314 and makes the determination of whether the video HyperFragment is interesting or not based on criteria associated with the task indicated by Workflow Engine 202, which is controlling the process. For example, any HyperFragment that includes a moving element might be considered as Interesting. Interesting HyperFragments are then sent to the next Distributed Expert, such as a person 318, as per the workflow. Person 318 views the video HyperFragment on a computing device/display 320 and can select elements shown in the video HyperFragment and mark them as either a Person, a Vehicle, or an Object. In this example, person 318 would mark the element in the video HyperFragment as a Vehicle.

Figure 4:
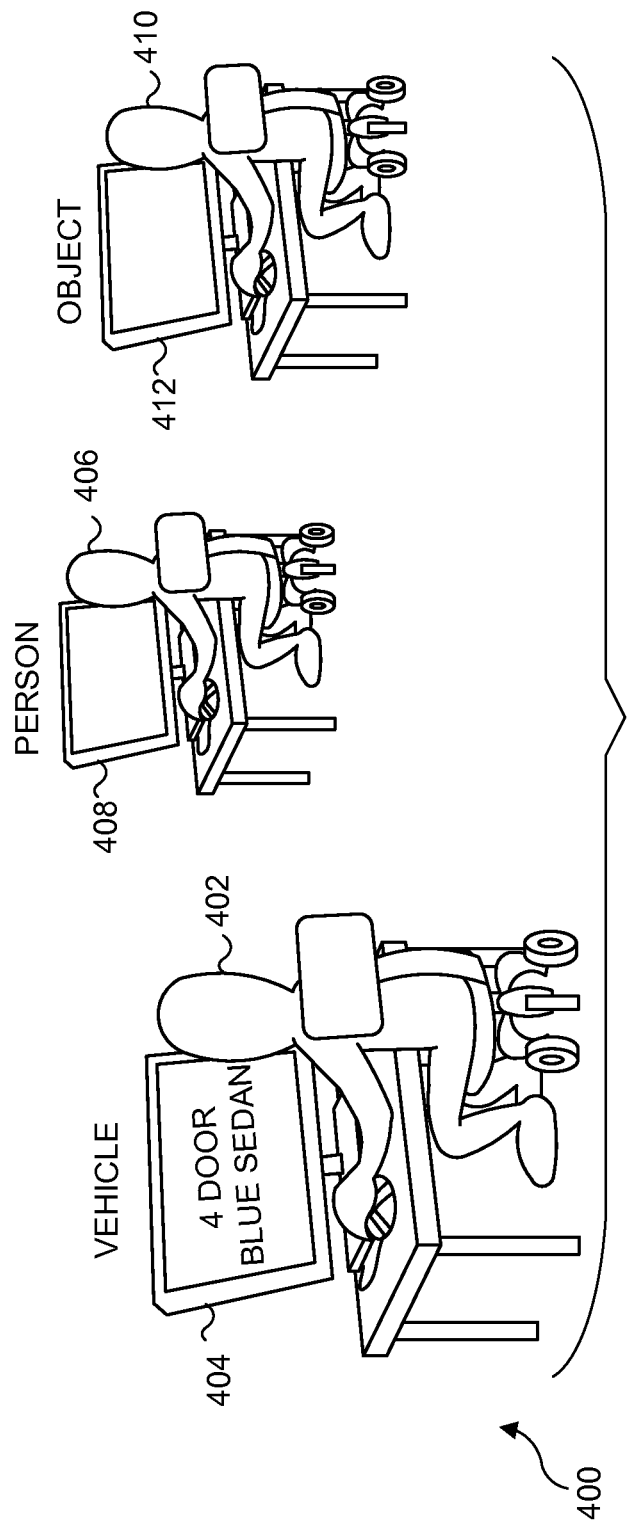
FIG. 4 is a schematic diagram showing the next stage of the workflow in which distributed human experts tag elements in the video HyperFragments.

The next step in this exemplary workflow for processing data is illustrated in a schematic diagram 400 shown in FIG. 4. In this simplified example, there are only three Distributed Experts—one for each type of element. However, it will be understood that there can be many Distributed Experts for each type of element, and the workflow may encompass simultaneously processing many video HyperFragments. Each person 402, 406, and 410 in this example is provided a single and different type of element in the video frames and asked to further tag that type of element, based on the video frame being displayed on the computing devices/displays 404, 408, and 412 that are respectively operated by these persons. For example, person 402, whose is one of the Distributed Experts employed for processing these HyperFragments, has tagged a vehicle as a four-door blue sedan, based on what the person has observed when viewing one of the video HyperFragments.

Figure 5:
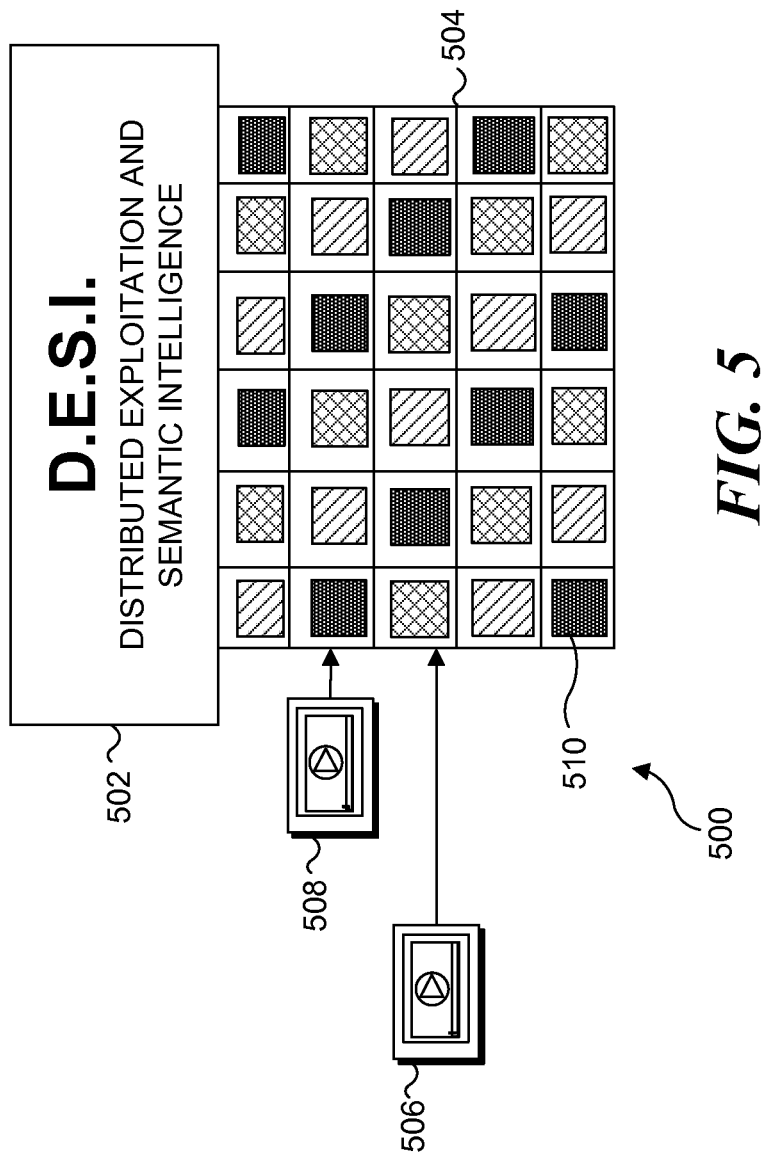
FIG. 5 is a schematic diagram illustrating how the video HyperFragments with tags are input to a Distributed Exploitation and Semantic Intelligence (DESI) system for further analysis and processing in accord with the present novel approach.

It is expected that all data processed during a workflow will be retained and stored in HyperAsset File System 208 (FIG. 2A). FIG. 5 illustrates a simple example 500 showing how a Distributed Exploitation and Semantic Intelligence (DESI) component 502 includes a datastore 504 in which video HyperFragments 506 and 508 are being input for storage. Data stored in datastore 504 is indexed by various criteria, such as represented by a block 510, to facilitate the easy retrieval of the data for future analysis. DESI is a tool that can be used by Distributed Experts to perform work on one of the nodes of the workflow. It is created such that it can pull work or receive work pushed to it, load the Tagonomy and GUI controls for the units of work to be performed at the node selected, and send the results of the work performed by the Distributed Experts back to the HyperNode to be fused with the HyperAsset being tagged by the humans (or AI components) that are the Distributed Experts.

Figure 6:
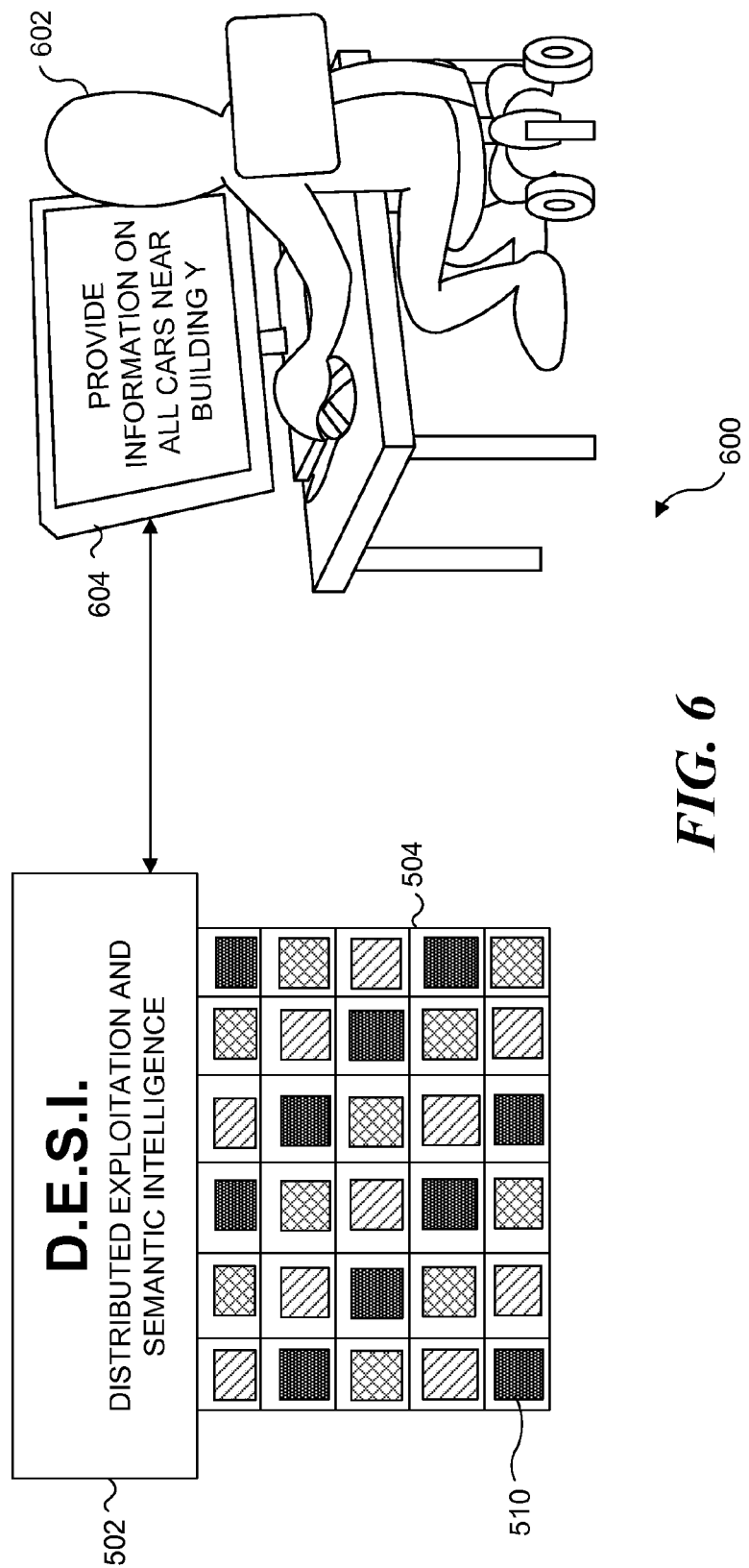
FIG. 6 is a schematic diagram illustrating how the DESI system can be queried for specific information.

For example, as shown in schematic diagram 600 in FIG. 6, a person 602 can use a computing device/display 604 to query the system to provide information generated from this simple human-based workflow used on a live video feed. In this example, person 602 is requesting DESI component 502 to "Provide information on all cars near building Y." The system can use the tag data and other information associated with video HyperFragments in datastore 504 to respond to the query by providing a list of the video HyperFragments showing cars near the specified building at a specified time/date.

While the preceding examples have illustrated the use of live streaming video to create video HyperFragments that are processed by the system, it must be emphasized that the data processed in a workflow by the system can be obtained from other sources that are not live. For example, a smart phone might send a video clip that had been stored on the smart phone to the DESI system for exploitation. The pre-recorded video clip might include tags based on information obtained from the smart phone. This data could then be used by the workflow to enable breaking up the tasks for processing by distributed human experts or by algorithms executed by computing devices included in the system. Further, it should be understood that the data processed and tagged in a workflow by the system can be acquired from virtually any place in the world, from many different sources. Such data can be uploaded or streamed to the DESI component for ingestion and processing by the system using advanced multi-bit rate functionality.

Figure 7:
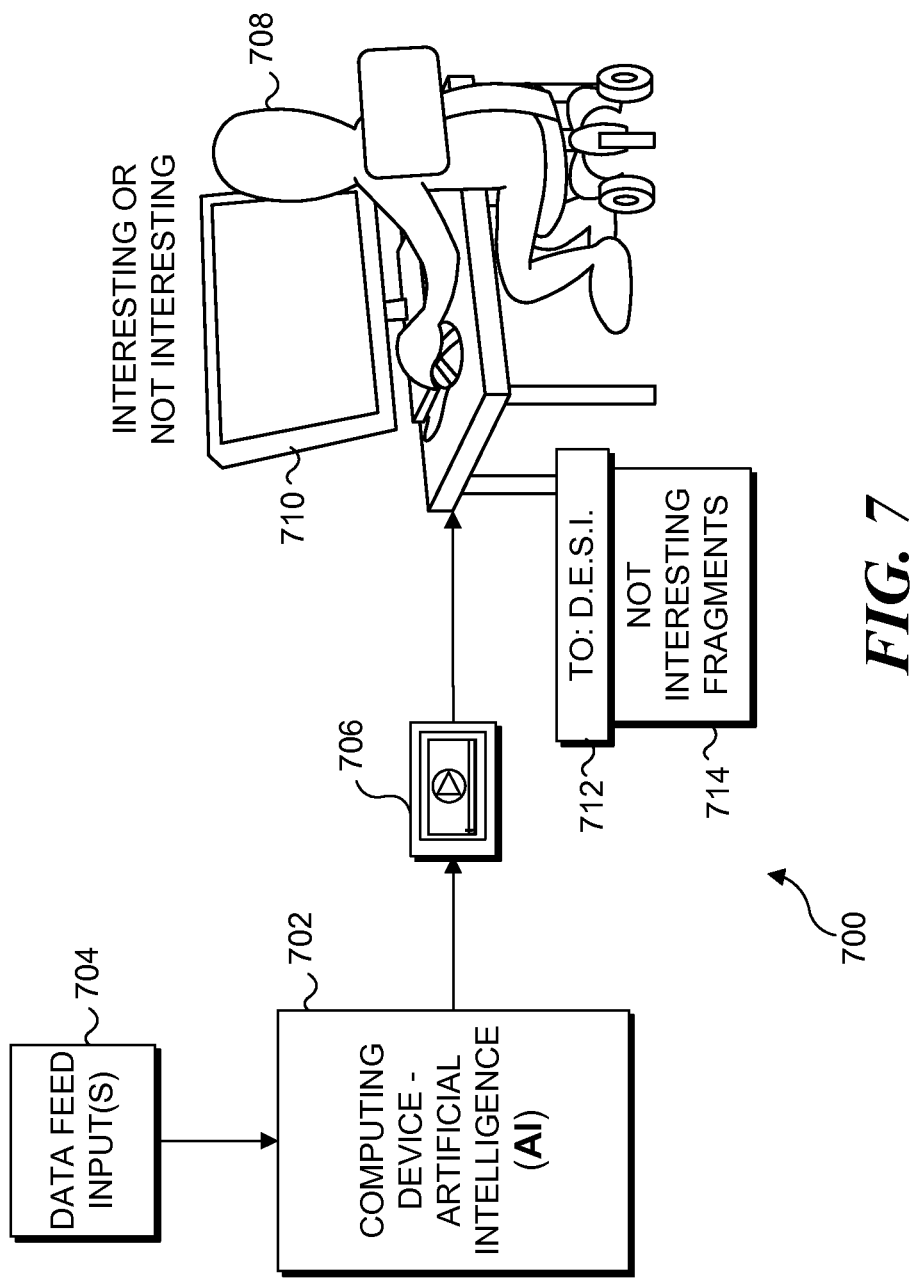
FIG. 7 is a schematic diagram illustrating how artificial intelligence (AI) systems can be used to process data at any point in the system and the AI plug-in algorithm or other type of software component can trigger sending data to one of the distributed human experts for further evaluation and exploitation.

Workflows can be configured so that at any point, AI software components can be executed. Such AI software components are typically computer vision algorithms, but AI software can implement other functions, based on the type of data available at the specific stage at which the algorithms are instantiated. In an example 700 shown in FIG. 7, data feed input(s) 704 convey data to a computing device AI software component 702 for processing in a work flow. Also, each plug-in or AI software component 702 in a workflow can trigger sending data, such as a video HyperFragment 706, to a human 708 for further exploitation. The human expert can view the video HyperFragment on a computing device/display 710 and then confirm that the video HyperFragment is either Interesting or Not Interesting, and send the video HyperFragment to DESI, as indicated in a block 712. Even video HyperFragments deemed to be Not Interesting will be stored by DESI, as indicated in a block 714.

Figure 8:
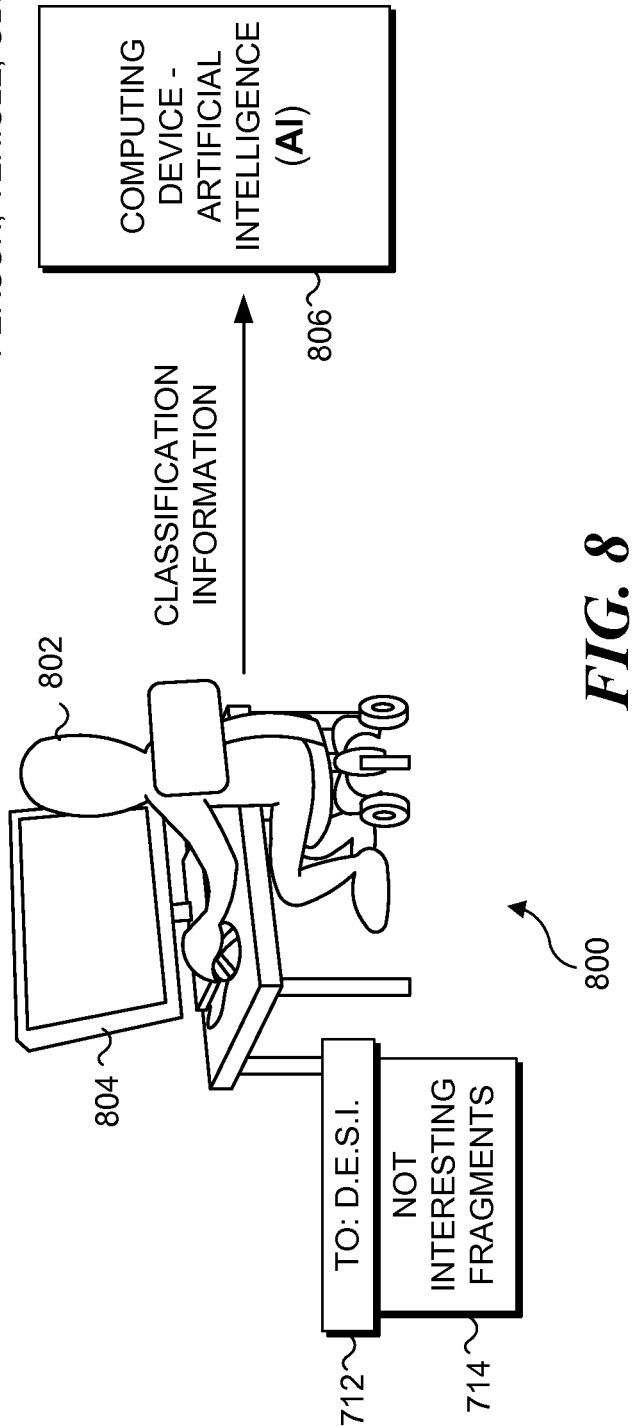
FIG. 8 is a schematic diagram illustrating how a workflow can trigger an AI algorithm to perform basic classification by taking the place of a human expert while using information from the human expert to perform its analysis.

In an example 800, illustrated in FIG. 8, a workflow can trigger an AI algorithm 806 to perform basic classification to identify an element in a video HyperFragment as a Person, Vehicle, or Object. This example also shows how an algorithm running on a computing device to perform AI functionality could take the place of a human while using information from a human 802 operating a computing device/display 804 to perform its analysis. Thus, information can be provided to a human expert by an AI algorithm, or an AI algorithm or plug-in can use information from a human expert to perform its AI functionality. It should be emphasized the simple Tagonomy used in this example of "Person, Vehicle, Object" is not in any way intended to be limiting on the present novel approach. Clearly, a Tagonomy having other tags can be employed, as appropriate to specific tasks performed by the present approach.

Figure 9:
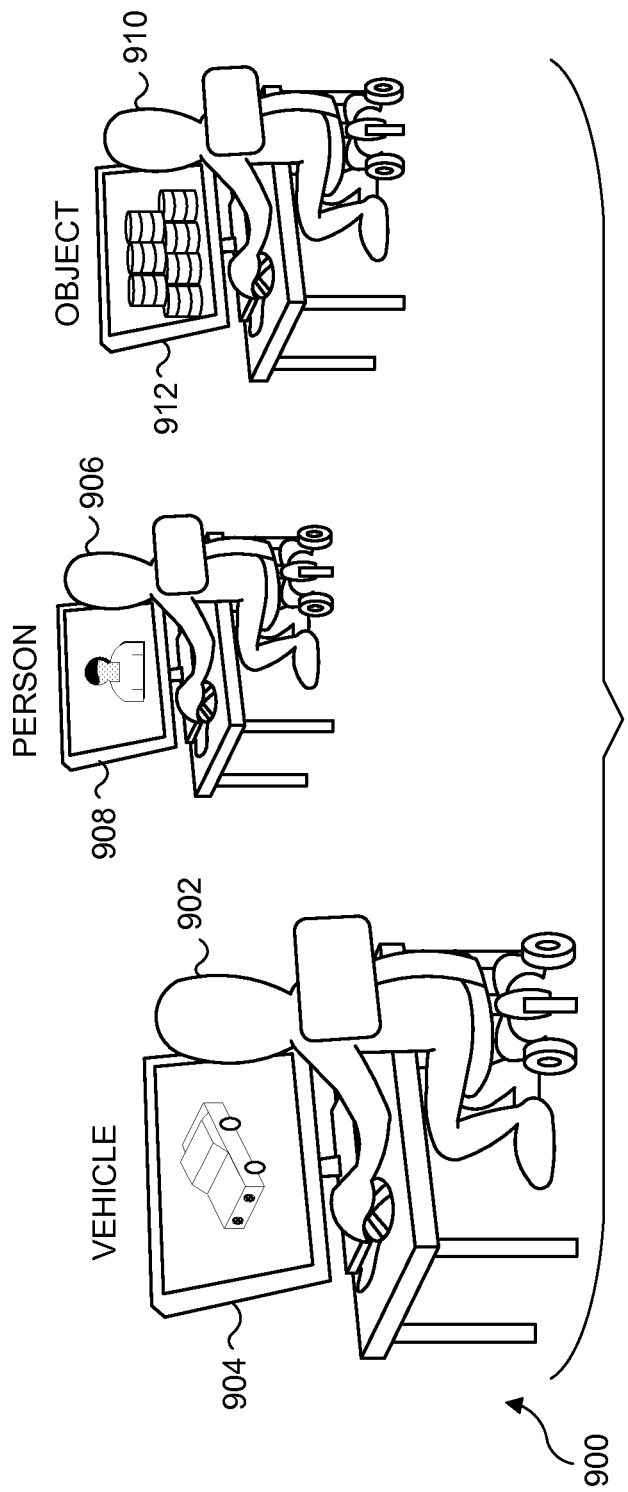
FIG. 9 is a schematic diagram illustrating how distributed human experts can be used to confirm what an AI algorithm might have done, or alternatively, to only confirm output from the AI algorithm if a confidence levels for the algorithm applied by the AI algorithm falls below a predefined level.

In FIG. 9, an example 900 illustrates how distributed human experts, e.g., people 902, 906, and 910 who are viewing video HyperFragments on computing devices/displays 904, 908, and 912 can be used to confirm what an algorithm might have done. It is possible to configure the system so that such people only confirm the output from an algorithm running on an AI if the confidence levels for the AI determinations fall below a predefined level, e.g., below 60%. (Note that 60% is merely intended as an example of a possible predefined confidence level, but is not intended to be in anyway limiting, since it is contemplated that other values might instead be selected for this purpose.)

Figure 10:
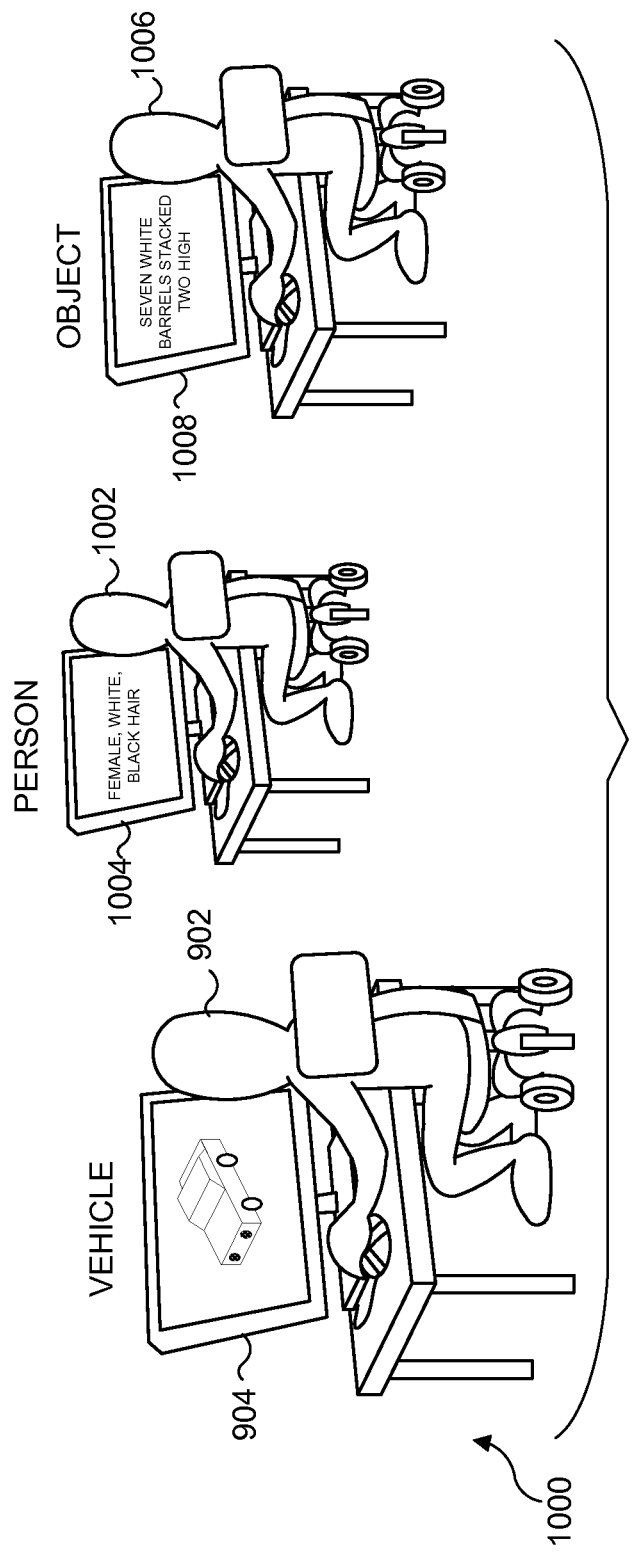
FIG. 10 is a schematic diagram illustrating how people can also add more data or details to a tagged fragment of input data after confirming that an AI algorithm classification was correct.

Further, as illustrated in an example 1000, shown in FIG. 10, human experts can be employed to add more data to a tagged video HyperFragment after they confirm the AI classification was correct. In this example, persons 1002 and 1006 are using their computing devices/displays 1004 and 1008 to add details about the respective video HyperFragment elements. Person 1002 has noted that the Person noted in the HyperFragment is female, white, and has black hair. Person 1008 has indicated that the Objects in the video HyperFragment (shown in FIG. 9) are seven white barrels stacked two high.

Example Using Present Technology to Detect Vehicles Making Illegal U-Turn

An exemplary block diagram 1100 in FIG. 11 illustrates how the present technology can be employed to process input data from one or more video sources, which may be fixed video cameras, or carried on mobile platforms such as an aircraft or drones. The goal of the system in this example is to detect when vehicles have made an illegal U-turn on a specific road, and further, to determine if the U-turn was "Normal or Abnormal." In this example, it has been noted that terrorists scouting a location for planting an improvised explosive device (IED) will typically make an illegal U-turn when a potential location for planting the IED along a road has been seen. It will be apparent that video data for a number of roads in an area where such IEDs might be planted should be processed to detect suspect vehicles making illegal U-turns that appear to be Abnormal, so that further steps may be taken to apprehend the terrorists and prevent the detonation of IEDs.

As was discussed in regard to FIG. 2A, HyperNode 200 includes Semantic Database 204. In connection with this exemplary application of the present technology, semantic data is sent to the Semantic Database to facilitate processing of the input video data. Semantic data differs from relational data in that each piece of data is presented in the form of a tuple, which comprises a Subject, Predicate, and Object, as discussed above. This type of data can be inserted (or in Semantic Data base terms "asserted") into the Semantic Database for defining universally unique identifiers (UUIDs) for the Subject and Object of each tuple, but have no relational information requirements up front. The HyperAsset system employed in HyperNode 200 enables Semantic Data to be kept at any level of the system, including at the HyperNode, HyperAsset, HyperTrack, HyperFragment, and HyperSlice levels. Depending on the type of data, HyperAssets can contain data abstracted into different containers. Each HyperAsset can have one or more HyperTracks. Each HyperTrack can contain one or more HyperFragments. Each HyperFragment can contain one or more HyperSlices. These layers of data abstraction provide a solid foundation to store data in small files, since HyperFragments are represented as a single file, while maintaining advantages for temporal data, at a HyperTrack level, which also enables alternative data versions or synchronized information. Each HyperFragment contains HyperSlices, which are serialized inside the HyperFragment file. For example, a single video with three bitrates would use a single HyperTrack for each bitrate, so that each track would have the identical number of HyperFragments, each containing perhaps five seconds of video. Inside each of these HyperFragments are HyperSlices, each one corresponding to a single frame of compressed video. Additionally all tuple data can be provided permissions, time stamped, and version controlled when new data is available to replace older versions. Ontologies are used to inform the Semantic Database how the Semantic Data relates to a model, in a manner similar to the relational schema of a database, but including additional rules that enable complex reasoning to infer additional data from the raw tuple assertions. Instance data is asserted into Semantic Database 204, representing actual data, while ontological data defines the rules and relations of the Semantic Data. Semantic Databases keep track of both of these data types as tuples in what is referred to as a "Triple Store." A Triple Store can span multiple computers and be implemented as a file, or stored in memory, or as a mix of both. The present approach deeply embeds the concepts of a Semantic Database such that tuples, as well as binary, or other data types can be fused in any level of a HyperAsset store.

The HyperNode has an in-memory Triple Store, but can also use the HyperAsset system as a file Triple Store. Methods have been optimized in the present system to move data from the file system into memory, based on real-time operational requirements. RDF Graph Data 214 in FIG. 2A is the term used for how this data is defined and sent into and out of a Triple Store. SPARQL is similar to SQL in that it is the language used to query a Semantic Database. The Semantic Database can then use one or more Triple Stores as data sources for responding to such a query.

A HyperFragmenter 1102 in FIG. 11 creates HyperFragments from the input video data in real-time. As the HyperFragments are created, a node at which the HyperFragmenter is disposed notifies a workflow 1104, which is set up as a listener of such an event. HyperFragments belong to HyperTracks, which belong to HyperAssets. A workflow, such as workflow 1104, can be triggered based on changes to any of these data elements, or the triggering can even based on the contents of an update to any such element. While the present example uses real-time input video data streams, it should be understood that it is also possible to present the same workflow with video on demand (VOD) content that is input faster than real time into HyperFragmenter 1102, or it may already be in the form of HyperAssets, and thus, already contain HyperFragments. In this case, workflow 1104 could be submitted, along with the actual data, the processing of which the workflow is intended to manage, or the data can be defined in the workflow as already existing within one or more HyperNodes and/or external data sources.

The present technology employs an ontology that describes the relationship between time, space, HyperAssets, HyperFragments, HyperSlices, objects per slice, and SuperFlows over time. A SuperFlow is a unique object that is identified inside a media stream, such as video data, over time. For example, a single car moving along a portion of a road in the streaming video would be considered a SuperFlow. Each HyperSlice would contain a single image, and the SuperFlow would define where in the single image the specific car was disposed, and would do so for every consecutive image in which the car appears in the HyperAsset. Having this ontology data associated with any element of the system to be defined, as well as content within input video data streams, means that it is possible to use each HyperNode as a Triple Store, where all types of Hyper and Super information including HyperAsset, HyperFragment, HyperSlice, and SuperFlow information, are made available to a Semantic Database. (Note that SuperFlows are made up of smaller constructs.) This approach provides a clear advantage, because tuple data does not require a relational schema or document data store. Thus, the tuple data can be bound to the structure to which it is describing, such as to a HyperFragment or a HyperSlice.

The HyperNode automatically uses information about each HyperAsset, and thus, the HyperTracks, HyperFragments and HyperSlices, to auto-generate tuple data based on the ontology modeling all of the data including SuperFlows, time, space and a few other items such as play lists in the present approach. As a result, it is possible, without any additional data, to utilize SPARQL to request HyperFragments created during a specific time range, or at a specific camera location.

For real-time data input to HyperFragmenter 1102, it automatically produces the tuple data, which is then sent to the Semantic Database, providing an initial framework of information about all of the HyperFragments and HyperSlices for the HyperAsset that HyperFragmenter 1102 is creating. Typically, HyperFragmenter 1102 fuses other data sources, such as GPS data, into the HyperFragments it is producing. For example, if GPS data is available, it is converted into tuple data and expressed using RDF. This GPS data in RDF format is then added to each HyperSlice of the HyperFragment. In this way, there are tuples representing GPS information for every HyperSlice, enabling a SPARQL query to include geo-coordinates. Any other metadata that is needed for queries or related workflows is also converted in this manner into tuple data, which can then automatically be asserted into Semantic Database 204 of HyperNode 200 (FIG. 2A).

Block diagram 1100 includes an algorithm 1 in a block 1106, which is employed for motion detection. It was noted above in regard to FIG. 2A that algorithm plug-ins 210 can be employed to process input data. In this example, algorithm 1 in block 1106 corresponds to a node of the workflow that is configured to trigger when new input HyperFragments are available that do not yet have the data this algorithm creates. (It is possible to keep track of specific types of data using Version Control and UUID data types.) Algorithm 1 is run to detect motion in HyperFragments of the input video data, and workflow 1104 is informed of the new data produced by algorithm 1, i.e., tuples describing areas of motion in each HyperSlice, produced by algorithm 1. The output of the algorithm is then re-fused back into the HyperAsset (i.e., into any element of it). The following discussion may help to clarify. Typically, when a video recording starts, a HyperAsset is created and the HyperFragmenter creates HyperFragments for every five seconds of video. Every element of the present system contains a key-value store and semantic triple store for information, which means that any level of the HyperAsset, HyperTrack, HyperFragment and HyperSlice can contain key value or semantic data. Additionally, version control is provided for these elements, as well as a data-group key. Thus, for example, on a HyperSlice, it is possible to create a data-group key of "AlgorithmX," and another data-group of "AlgorithmY." When AlgorithmX is run the first time, the data can be output and stored back into the HyperSlice. The procedure is referred to as "fusing the data back into the HyperFragment," since the HyperSlice is part of the HyperFragment. However, it should be understood that it is possible to "fuse back" at any level of the present system. AlgorithmX can also be re-run with different parameters, and the resulting output data can also be stored in data-group AlgorithmX, and the version control can be used to store the data as version n+1. This functionality means that AlgorithmX can be run many times and can fuse its data into its own data-group, where each time it is run the output is added, but does not replace the original data. Further, AlgorithmY is a totally different algorithm that can be run and which can direct its output to data-group AlgorithmY. In some cases, the output of an algorithm is larger than would be reasonable to add using the key-value store because doing so would make the HyperFragment larger than would be desirable for performing other duties, such as streaming. In this case, HyperFragments are usually organized in different HyperTracks in synchronized order, which means that HyperFragment N of HyperTrack X corresponds temporally to HyperFragment N of HyperTrack X+Y. Thus HyperFragments are organized between tracks to contain information from exactly the same time.

An algorithm 2 in a block 1108 of FIG. 11 is employed for target tracking and is a node in the workflow that is configured to trigger when new motion detection data output from algorithm 1 is added to the system, but on a per-HyperFragment basis. So, algorithm 2 waits for a HyperFragment that includes the output data from algorithm 1 to be provided. An object that is in motion is tracked by algorithm 2 of block 1108, and workflow 1104 is informed of the new tracking data output from algorithm 2. The output tracking data is then re-fused back into the HyperAsset (i.e., into any element of it). After algorithm 2 has been applied to HyperFragments of input video data, all moving objects of such HyperFragments are identified with a UUID over time and space. It should be noted that any occlusion (i.e., which can occur when an object moves behind a wall or other structure that blocks it from being captured in the streaming video) may cause the same object to have two UUID's over time. This output thus comprises tuples providing each object an UUID, as well as indicating where the algorithm sees the object for every HyperSlice of the input video data HyperFragment. (Note, it is possible to provide input to algorithm 2 from a previous HyperFragment, such that the UUID can span multiple HyperFragments. Additionally, more complex systems could identify the object, for example, using Facial Recognition, and then persist the UUID over time as the same object is again recognized in subsequent HyperFragments, rather than just due to tracking its motion in a single HyperFragment or HyperAsset.)

An algorithm 3 in a block 1110 of FIG. 11 is a node in the workflow that is configured to trigger when new HyperFragments of the input video data are available that are at a higher than desired bitrate. Algorithm 3 thus transcodes such higher bitrate HyperFragments, to produce an identical HyperFragments, but at a lower acceptable bitrate. Each lower bitrate HyperFragment is then inserted into another track for further processing in the workflow.

In this example in which the system is trying to detect vehicles making an illegal U-turn, human experts can log into the system and request to work on any of a Node 1 in a block 1114, a node 2 in a block 1116, or a node 3 in a block 1118. It is possible for the software executing the workflow to provide a human expert with the highest priority work for any node selected by the human, to ensure that the human experts are used in an optimal manner. The client software executed by the computing device/display used by each of the human experts employs the GUI information of the node for which work is to be performed. For example, if a Tagonomy is configured for node 2 in block 1116, the GUI will present the human expert with a list box enabling the expert to traverse through the Tagonomy, making choices of a Person, a Vehicle, or an Object, thus generating tuple data to be fused back into the HyperAsset that was processed by the human expert. As discussed above, it is also contemplated that computing devices executing AI algorithms or software can be employed in placed of, or in addition to human experts.

In this example, node 1 in block 1114 can employ any of 1 through N human experts or "taggers" to determine if a HyperFragment being processed is Interesting or Not Interesting. A human expert or "tagger" requests "work" from workflow 1104 and in response, ten HyperFragments are sent to the tagger (i.e., operating in Pull Mode). It should be noted than in regard to this node and the other nodes discussed below for which human experts are employed for distributed processing of the HyperFragments, the choice of ten HyperFragments is merely exemplary and not in any way intended to be limiting, since it will be understood that any number of HyperFragments or units might instead be requested.

In this example, node 1 might be configured to only pull HyperFragments that are less than a specified bitrate X. In that case, node 1 may wait for algorithm 3 to complete its transcoding job to produce HyperFragments of the lower bitrate X. Node 1 is loaded with a very simple Tagonomy, in which the human expert only determines if a HyperFragment is either Interesting (i.e., pointing to an Interesting Fragment Ontology Node) or Not Interesting (pointing to a similar ontology Node that is of the opposite sense). The tagger working on node 1 employs a computing device that executes client software providing a GUI that presents theses Tagonomy options to the human expert, enabling the human expert or tagger to select Interesting or Not Interesting. The output provide by the tagger working at node 1 is thus zero or more HyperFragments marked as Interesting or Not Interesting, using tuple data fused back into the HyperFragment. (Note that when there are multiple video bitrates, each a single HyperTrack, it is typical to create a HyperTrack that contains the metadata associated with the video track group.)

At node 2, in block 1116, any of 1 through N human experts or taggers can request work. In response, SPARQL generates query to select ten object UUIDs created by the Target Tracking algorithm that have not been marked as a Person, Vehicle, or Object. These ten units of work are sent to the tagger in pull mode. However, for this example, workflow is configured to only return HyperFragments to a tagger that are marked as "Interesting," and for which algorithm 2 output data is available. In this example (but not intended to in any way be limiting on the present technology), a unit is defined as being five seconds of video data for a single tracked target. Node 2 is loaded with a simple Tagonomy that enables the human expert to identify an element in the HyperFragment as a Person, a Vehicle, or an Object. Further, this example requires that work performed on node 2 must have a "Region of Interest" (ROI) marked inside a HyperFragment being processed. The client GUI software executed on the human expert or tagger's computing device thus requires the tagger to specify a ROI (e.g., using a pointing device controlled cursor) and then presents the three-option Tagonomy to the tagger. The human expert or tagger marks a ROI as containing a Person, Vehicle, or Object (assuming that such an element that is one of these options exists in a ROI in a HyperFragment). A target tracking overlay control is provided in the GUI, and it enables the tagger to correct the positioning/size of a selection box around the object tracked that was auto-generated by the tracking procedure of algorithm 2. For each UUID shown in the ROI, new tuple data is generated indicating whether the UUID is for a Person, a Vehicle, or an Object.

At node 3 in block 1118, any of 1 through N human experts or taggers can accept work. In response to a tagger making a request for work, the SPARQL generates an input query that selects ten object UUIDs created by the target tracking of algorithm 2 that have been marked as having a ROI including a Vehicle and which do not yet have any vehicle activity information. The ten units of work are sent to the tagger (using pull mode), where the work is defined by all target UUIDs marked as Vehicle. Node 3 is loaded with a simple Tagonomy that enables the tagger to indicated whether the vehicle is: (a) starting; (b) stopping; (c) accelerating; (d) decelerating; (e) making a turn; or (f) making a U-turn. The GUI provided by the client software executed on the computing device employed by the human expert or tagger provides a Tagonomy list box control that enables the tagger to select one of the preceding options for a vehicle that is in a HyperFragment. A target tracking overlay control shows the vehicle for the duration it is tracked in the HyperFragment being processed. The tagger can pause the vehicle and select from the Tagonomy options, producing tuple data, for each area of the track on which the vehicle performs one of the activities included in the Tagonomy. The output for work performed at node 3 is thus activity information at specific points in time for a specific vehicle UUID and its tracking data.

Note that FIG. 2A includes external data 218. In this example for detecting vehicles making illegal U-turns, workflow 1104 is configured to have access to external data comprising map data. The workflow can thus determine if specific GPS coordinates where a U-turn was detected at node 3 is a location where a U-turn is legal or illegal. For example, a U-turn at an intersection may be legal, but a U-turn in the middle of a road may be illegal. By correlating a GPS coordinate where a U-turn was determined to have occurred at node 3 with a map location that is not at an intersection, the system can detect that an illegal U-turn has been made by the vehicle included in a HyperFragment. It is also possible to develop external data components that import data from other systems and translate the data into tuples that are then added to a HyperAsset such that it becomes available in the Semantic Database.

Event definitions 220 are included in HyperNode 200 in FIG. 2A and are rules that can review all tuple data being added into the HyperNode and create new tuple data based on the definition logic. In connection with the present example for detecting vehicles making illegal U-turns, an event definition is created that triggers each time that a human expert working on node 3 specifies that a vehicle in a HyperFragment was making a U-turn. In this case, GPS data fused to the HyperFragment is available such that the event definition can then review the location of the U-turn and correlate this to a map accessed as external data, as discussed above. If the U-turn is at an intersection, additional tuple data is associated with the U-turn event indicating that it is a "legal" U-turn; otherwise, tuple data is created indicating that it is "illegal," since it was performed in the middle of the road. Further, event definitions are typically transformations of data points that are in the system with the goal of creating additional useful data points. In this case, the GPS and activity data for vehicles is used to add information about legal versus illegal U-turns detected in the HyperFragments that have been processed.

This example also employs algorithm 4, which is shown in a block 1112 of FIG. 11. Algorithm 4 triggers when new vehicle activity information (i.e., activity of any type) is available and is a computer learning algorithm that is executed to review vehicle patterns to detect "Normal" versus "Abnormal" activities, for example, based on historical data. The input to algorithm 4 includes activity information, target tracking information, and available map data, along with the UUID of the vehicle being tracked that has been tagged with one of the possible vehicle activities (i.e., one of the six activities in the Tagonomy for node 3). Algorithm 4 uses historical statistics "bucketed" by day of week, and time of day for each area of a road on the map that has been monitored with video cameras to produce the input video data supplied to HyperNode 200 for processing. The output of algorithm 4 is a confidence factor indicating if the vehicle's activity is Normal or Abnormal, which in the example, corresponds to a confidence factor regarding whether a U-turn made by a vehicle (even if illegal) is Normal or Abnormal—based on the historical data. For example, historical data may indicate that a number of vehicles had been observed making U-turns at a specific location along the road because of some logical reason that would be viewed as normal—for instance, because a sign identifying a turn on a road to a popular destination was hidden by shrubbery and thus was not visible to a driver until a vehicle had already passed the turn.

Another component of HyperNode 200 in FIG. 2A is Situation Definitions 222, which are more complex event definitions that typically require more logic and often incorporate data from Neural, Learning, and Path Algorithms. In regard to workflow 1104 of FIG. 11, the processing of HyperFragments has provided information about all vehicle activities, including if the U-turns were legal or illegal and if the vehicle performing the U-turn is performing what is historically a Normal or Abnormal action. A Situation Definition can now be created for this example, which uses all of these data points to generate an event for all Abnormal illegal U-turns in a specific geographical region, or along specific section of a road. Alternatively, as another example of a Situation Definition, given the workflow events discussed above, a Situation Definition can be created that is triggered when two or more vehicles perform an Abnormal U-turn at the same location along a road, within 10 seconds of each other.

Actionable events/Refined events 226 in FIG. 2A relate to implementing automated or human checks on output data being generated by a workflow. This function is similar to that of a workflow node. The Actionable or Refined events can indeed be implemented using a workflow node as a model. However, these events are only implemented when one or more external systems (i.e., outside the present novel system) needs to be triggered, while the other nodes of a workflow are focused more on developing internal data concepts for use in the workflow of the present system. In regard to the task of workflow 1104 of detecting vehicles making Abnormal and illegal U-turns, for all situational definitions that trigger as discussed above, workflow 1104 can send the results, including all supporting data in a single collated report, to a distributed expert (which can be a human and/or an AI algorithm executing on a computing device). This distributed expert can then determine whether the report is significant and needs further action, and if so, might then send the full report to an appropriate operational group in the government who will review and take desirable actions based on the information in the report. For example, a branch of the military responsible for operations in an area where there is a road on which such activity was detected might decide to set up a covert surveillance of the specific location along the road where the activity was detected and attempt to apprehend terrorists setting up an IED at that location.

Use of Tagonomy to Break Down Tasks for Distributed Processing

The present system is unique in how it uses a Tagonomy to break down tasks for each workflow node that is processed by the distributed experts. The prior art has used an Ontology to perform this task, and as a result, the Ontology ends up functioning as a Taxonomy, which no longer provides the benefits of Ontologies. Breaking down tasks performed by distributed human experts or algorithm and enabling a Tagonomy to provide a logic tree with paths and properties provides a novel way of linking to an Ontology, but in a way that can be understood and utilized by the workflow system and/or the distributed human experts. In its most simplistic form, the process of simply breaking down the tasks into smaller work units, and applying a Tagonomy per task that links to an Ontology is novel approach that does not require the other components of the HyperNode system. The key point of this process is providing the Tagonomy for each task that is performed at each workflow node. This novel approach can be implemented without dividing the input data into without fragments and is applicable to other types of processes besides the examples discussed above. However, the addition of the other components of the HyperNode, such as the HyperFragmenter, Semantic Database, etc. provide additional improvements to the concept and add to the novelty of the present system and the method of processing input data as discussed above.

Exemplary Computing Device for AI or System

FIG. 12 illustrates a functional block diagram of a generally conventional computing device 1200, which can be employed for executing software to implement the present novel approach or can be used for a hardware device that is optimized and designed to implement this approach. In addition, computing device 1200 can be employed for executing algorithms to perform various functions, including implementing an AI component of the present approach. Computing device 1200 can, for example and without any implied limitation, be a desktop computer, a server, a laptop, a tablet, a personal data assistant (PDA), or any other type of logic device capable of carrying out logical functions or executing software programs comprising machine language instructions. In the example illustrated in FIG. 12, a central processing unit (CPU) 1202 is used to execute machine instructions that are loaded into a memory 1206 and accessed over a data bus 1204. These machine executable instructions may be stored in non-transitory form as one or more software programs or modules on a non-volatile memory 1208, which can be, for example, a hard drive, a solid state disk (SSD), an optical disk and reader, or other type of memory device. The machine executable instructions may also be stored on either magnetic or optical disks that can be read, loaded into memory 806, and executed by CPU 1202, or can be downloaded from a remote computer (not shown). Memory 1206 can also store other machine executable instructions, such as those used for implementing an operating system, when executed by CPU 1202, and may include both random access memory (RAM) and read only memory (ROM). A user interface 1210 is coupled to data bus 1204 and enables a user of computing device 1200 to provide input to CPU 1202 on a keyboard or keypad, and by using a pointing device, such as a mouse, trackball, touch pad, etc. to control a cursor used for selecting options and for moving or modifying graphic images presented on a visual display 1212. A network interface 1214 coupled to data bus 804 can enable bidirectional data communication in one or more data formats such as WiFi, Ethernet, and Bluetooth, to name a few, by way of example. Network interface 1214 can thus couple computing device 1200 in data communication with a local area network (LAN), the Internet, a wide area network (WAN), and/or with other computing devices, or data sources. If computing device 1200 is used as the hardware device for implementing the present approach, it can be uniquely scaled with the proper CPU, and Memory:SSD size ratio for optimal performance, since the present approach requires much more memory and SSD space than most general software programs. Creating a platform that has these tiers of storage, it is then possible to optimize the software to the configuration in order to greatly optimize the speed and efficiency of the device.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

What is claimed is:

1. A dynamic event detection architecture configured as one or more hypernodes and comprising:
   (a) a hardware workflow engine that runs one or more workflows employed for processing input data by facilitating logic and state manipulation of the input data based on requirements of a specified task;
   (b) a semantic database defined by an ontological model that is related to the specified task and which includes a meaning, rules, and data elements based on the ontological model;
   (c) a hyperfragmenter system that processes the input data in real-time, in a workflow, to produce fragments of input data that are self-contained and discrete;
   (d) a hyperasset file system joined with the semantic database such that both operate automatically, the hyperasset file system enabling the fragments of input data to be stored and retrieved based on specified criteria;
   (e) a plurality of distributed experts that use an application program interface to facilitate review of the fragments of input data by the distributed experts at any point in the workflow and to provide additional information to the fragments of input data;
   (f) a plurality of event definitions used by a first rule-based language engine to define events based on the fragments of input data in the workflow or based on relationships defined in the semantic database;
   (g) a plurality of situation definitions used by a second rule-based engine to define complex situations to create situational rules; and
   (h) a filtration system that applies the situational rules to the workflow to determines if an output of the workflow requires further analysis.

2. The dynamic event detection architecture of claim 1, wherein the filtration system determines if the output should be exported to an external system for further analysis to determine if the output represents a normal activity or an abnormal activity.

3. The dynamic event detection architecture of claim 1, wherein the filtration system determines whether the output represents a normal activity or an abnormal activity, the determination being based on a comparison of the output to historical training data input by the filtration system, the filtration system further refining definition criteria used to identify the abnormal activity by further analysis of related activities associated with events in the historical training data.

4. The dynamic event detection architecture of claim 1, further comprising a plurality of path algorithms that can be triggered by the workflow and can be dependent on previously processed fragments of input data becoming available, the plurality of path algorithms being responsible for running and maintaining a state engine or statistical model system.

5. The dynamic event detection architecture of claim 1, wherein the plurality of distributed experts comprises a plurality of humans.

6. The dynamic event detection architecture of claim 1, wherein the plurality of distributed experts comprises a plurality of computing devices that execute artificial intelligence algorithms.

7. The dynamic event detection architecture of claim 1, wherein the plurality of distributed experts perform at least one of the following functions in regard to a fragment of input data:
   (a) determine if the fragment of input data is interesting or not interesting;
   (b) determine if a fragment of input data that has been determined to be interesting includes at least one of a plurality of predefined specified elements; or
   (c) adding additional details regarding a type of the at least one of the plurality of predefined specified elements that was determined to be included within the fragment of input data.

8. The dynamic event detection architecture of claim 7, wherein a tagonomy is employed to specify tags applied to the plurality of predefined specified elements included in the fragments of input data.

9. The dynamic event detection architecture of claim 7, wherein the plurality of distributed experts include computing devices that execute artificial intelligence algorithms that perform at least one of the functions and wherein the plurality of distributed experts further include humans who review results of the functions performed by the computing devices that execute the artificial intelligence algorithms to either confirm or modify the results.

10. The dynamic event detection architecture of claim 9, wherein the plurality of event definitions and the plurality of situation definitions employ neural algorithms to refine definitions of events related to the specified task based on ground truth data, historical training data, and on input provided by the humans comprising the plurality of distributed experts who review the results of the functions performed.

11. The dynamic event detection architecture of claim 10, wherein the filtration system uses the definitions of the events related to the specified task that have been refined as the definition criteria, and the fragments of input data that have been tagged and provided with the additional details to identify any abnormal activity evident in the fragments of input data that have been tagged.

12. The dynamic event detection architecture of claim 11, wherein when identifying the abnormal activity, the filtration system applies rules included in the semantic database in analyzing the fragments of input data that have tagged.

13. The dynamic event detection architecture of claim 1, wherein the filtration system employs the situational rules created in the plurality of situation definitions in producing the output of the workflow engine.

* * * * *